(12) United States Patent
Gupta et al.

(10) Patent No.: US 10,664,629 B2
(45) Date of Patent: *May 26, 2020

(54) SYSTEM AND METHOD FOR AUTOMATED MANUFACTURING OF CUSTOM APPAREL

(71) Applicant: 3D Tech LLC, Malibu, CA (US)

(72) Inventors: Neil Rohin Gupta, Costa Mesa, CA (US); Paul Eremenko, Mountain View, CA (US)

(73) Assignee: 3D Tech LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,854

(22) Filed: Apr. 8, 2018

(65) Prior Publication Data
US 2018/0253508 A1    Sep. 6, 2018

Related U.S. Application Data

(63) Continuation of application No. 14/202,271, filed on Mar. 10, 2014, now Pat. No. 10,366,175.
(Continued)

(51) Int. Cl.
*G06F 30/00*      (2020.01)
*A41H 3/00*      (2006.01)
(Continued)

(52) U.S. Cl.
CPC ............ *G06F 30/00* (2020.01); *A41H 3/007* (2013.01); *G06Q 30/0621* (2013.01);
(Continued)

(58) Field of Classification Search
CPC ........... A41H 42/00; A41H 3/04; A41H 3/007
(Continued)

(56) References Cited

U.S. PATENT DOCUMENTS 4,527,402 A * 7/1985 Swallow ................. A61F 13/08
                                                         2/239
4,835,699 A    5/1989 Mallard
(Continued)

FOREIGN PATENT DOCUMENTS

DE    WO2017220638 A1    12/2017
RU    WO2017213539 A1    12/2017

OTHER PUBLICATIONS

Wang, Charlie CL, Yu Wang, and Matthew MF Yuen, Design Automation for Customized Apparel Products, Computer—Aided Design 37.7 (2005): 675-691, US.
(Continued)

*Primary Examiner* — Nathan E Durham
(74) *Attorney, Agent, or Firm* — Ascenda Law Group, PC

(57) ABSTRACT

A centralized command and control network system for the automated manufacture of a personalized custom-fit garment comprises a centralized control system; automated programmable manufacturing equipment configured for assembling and stitching the personalized custom-fit garment from a digital pattern; and automated programmable material handling equipment configured for transporting the personalized custom-fit garment or its components through each step of the manufacturing equipment. After the customer has had his or her body scanned, and selected and personalized a garment design, the inventive manufacturing system will then manufacture the garment upon receipt of the order in an automated manner without requiring further substantive manual intervention or touch labor. The resultant personalized custom-fit garment is based on the customer's three-dimensional body shape and style and fit preferences. The system can be used to prepare any kind of garments.

9 Claims, 16 Drawing Sheets

Related U.S. Application Data

(60) Provisional application No. 61/792,506, filed on Mar. 15, 2013, provisional application No. 61/792,743, filed on Mar. 15, 2013.

(51) Int. Cl.
    *G06Q 30/06* (2012.01)
    *G06Q 50/04* (2012.01)
    *A41H 3/04* (2006.01)
    *G06F 113/12* (2020.01)
    *A41H 42/00* (2006.01)

(52) U.S. Cl.
    CPC .............. *G06Q 50/04* (2013.01); *A41H 3/04* (2013.01); *A41H 42/00* (2013.01); *G06F 2113/12* (2020.01); *Y02P 90/30* (2015.11)

(58) Field of Classification Search
    USPC .................................................. 700/130–133
    See application file for complete search history.

(56) References Cited

U.S. PATENT DOCUMENTS

| | | | |
|---|---|---|---|
| 4,916,624 A * | 4/1990 | Collins .................. | A41H 3/007 700/132 |
| 4,916,634 A * | 4/1990 | Collins .................. | A41H 3/007 700/132 |
| 4,926,344 A * | 5/1990 | Collins .................. | A41H 3/007 700/132 |
| 4,964,031 A | 10/1990 | Gotoh | |
| 5,046,013 A | 9/1991 | Ueda et al. | |
| 5,124,928 A | 6/1992 | Aemmer | |
| 5,517,404 A | 5/1996 | Biber et al. | |
| 6,163,733 A | 12/2000 | Rubel | |
| 6,205,370 B1 | 3/2001 | Blaimschein et al. | |
| 6,499,513 B1 * | 12/2002 | Couch ...................... | A41H 3/08 112/470.03 |
| 6,516,240 B2 | 2/2003 | Ramsey et al. | |
| 6,520,057 B1 | 2/2003 | Steadman | |
| 6,546,309 B1 | 4/2003 | Gazzuolo | |
| 6,564,118 B1 | 5/2003 | Swab | |
| 6,611,730 B1 * | 8/2003 | Stoll ...................... | D04B 37/02 700/131 |
| 6,665,577 B2 | 12/2003 | Onyshkevych et al. | |
| 6,907,310 B2 * | 6/2005 | Gardner .................. | A41H 1/00 700/132 |
| 6,968,075 B1 * | 11/2005 | Chang ................. | G06K 9/00214 382/111 |
| 7,260,445 B2 | 8/2007 | Weiser et al. | |
| 7,479,956 B2 | 1/2009 | Shaw-Weeks | |
| 7,657,340 B2 | 2/2010 | Lind | |
| 7,663,648 B1 | 2/2010 | Saldanha et al. | |
| 8,307,560 B2 | 11/2012 | Tulin | |
| 8,348,371 B2 | 1/2013 | McDowell et al. | |
| 8,660,902 B2 | 2/2014 | Coulter | |
| 2001/0026272 A1 | 10/2001 | Feld et al. | |
| 2002/0002416 A1 | 1/2002 | Herman, Jr. | |
| 2002/0002938 A1 | 1/2002 | Alberts et al. | |
| 2002/0059248 A1 | 5/2002 | Farchione | |
| 2002/0138170 A1 | 9/2002 | Onyshkevych et al. | |
| 2003/0011590 A1 | 1/2003 | Kung et al. | |
| 2004/0049309 A1 | 3/2004 | Gardner et al. | |
| 2004/0078285 A1 | 4/2004 | Bijvoet | |
| 2006/0015207 A1 * | 1/2006 | Weiser .................. | G06Q 10/06 700/132 |
| 2006/0190122 A1 | 8/2006 | Loeb | |
| 2007/0005174 A1 | 1/2007 | Thomas | |
| 2008/0228312 A1 | 9/2008 | Dickerson | |
| 2008/0312765 A1 | 12/2008 | Gardiner et al. | |
| 2009/0222127 A1 * | 9/2009 | Lind ...................... | A41H 3/007 700/132 |
| 2010/0228646 A1 | 9/2010 | Heidel | |
| 2012/0030928 A1 | 2/2012 | Park et al. | |
| 2014/0277683 A1 | 9/2014 | Gupta | |
| 2015/0332366 A1 | 11/2015 | Ginocchi | |
| 2017/0258164 A1 | 9/2017 | Barnet et al. | |
| 2017/0273383 A1 | 9/2017 | deGuzman et al. | |
| 2017/0364982 A1 | 12/2017 | Lee | |
| 2018/0042322 A1 | 2/2018 | Weiler | |

OTHER PUBLICATIONS

Susan P. Ashdown, Lucy Dunn, A study of automated custom fit: Readiness of the Technology for the apparel Industry, Clothing and Textiles Research Journal 24.2 (2006): 121-136. US.

"Baxter", Rethink Robotics, Baxter product datasheet, Sep. 2012, 3 pages.

"3D Fashion Design Software by Browzwear-V-Styler," website printout from http://ww.browzwear.com/products/v-styler, retrieved on Feb. 25, 2014, 2 pages.

"3D Fashion Design Software by Browzwear-V-Stitcher," website printout from http://www.browzwearcom/products/v-stitcher, retrieved on Feb. 25, 2014, 2 pages.

Siyu, E., "Evaluation of Visible and Invisible Fiducial Markers for Clothing Tracking," Electrical Engineering and Computer Sciences, University of California at Berkeley, Jun. 1, 2012, 21 pages.

"My Virtual Model—Technology that Outfits," website printout from http://corpo.myvirtualmodeL.com/gallery.html, retrieved on Feb. 25, 2014, 3 pages.

"3D Suite, Create Garments, Fit to Avatar and Animate," website printout from http://www.optitex.com/en/3D-Suite-Create-Garments-Fit-to-Avatar-Animate, retrieved on Feb. 25, 2014, 3 pages.

* cited by examiner

| Line Segment 1 | | Transit |
|---|---|---|
| | Front Fly | 130 |
| | Front Pockets | 190 |
| | Front Panel Join | 110 |
| Line Segment Total | | 430 |

| Line Segment 2 | | Transit |
|---|---|---|
| | Back Panel Yoke | 135 |
| | Back Pocket | 75 |
| | Back Panel Join | 145 |
| | Front & Back Join | 60 |
| | Waistband | 125 |
| Line Segment Total | | 540 |

| Line Segment 3 | | Transit |
|---|---|---|
| | Button Hole | 27 |
| | Belt Loop | 53 |
| | Leg Hem | 40 |
| Line Segment Total | | 120 |

| Total Transit Time (min) | 18.2 |
|---|---|

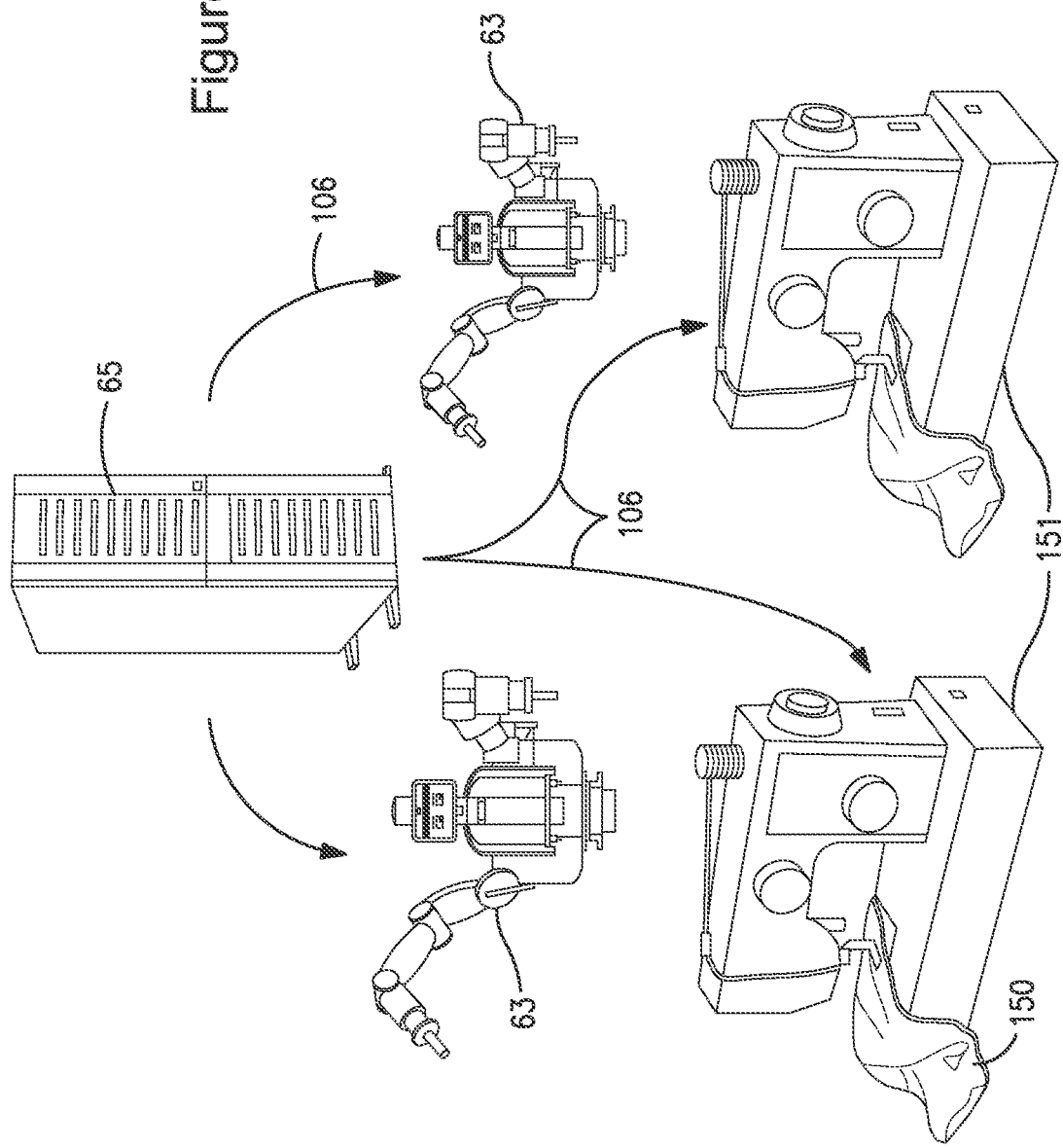

Figure 21

| Machine Class | Machine Type |
|---|---|
| Stitching Machines | |
| | 3-Needle Double Chainstitch |
| | 1-Needle Lockstitch |
| | 1-Needle Serger |
| | Bartack |
| | 2-Needle Chainstitch |
| | 5-Needle Serger |
| | 2-Needle Belt looper |
| | Buttonholer |
| Computerized Sewing Machines | |
| | Auto Pocket Setter |
| | Computerized Cycle Machine |
| Fabric Management Hardware | |
| | Static Cutting Table |
| | Fabric Spreader |
| | Fabric Rack |
| | Fabric Fixtures |
| | UV Vision Hardware |
| | Robotic Manipulators |
| | Gantry System for Robots |
| Finishing Equipment | |
| | Washers |
| | Dryers |
| | Steamer/Press |
| | Air Compressor |
| | Rivet Machine |
| Other Equipment | |
| | Network management Computer |
| | Network interface control boards |

Figure 22

| Operation Description | Time in Seconds |
|---|---|
| Construct Fly and Attach Front Pieces | |
| Aquire Right Fly Facing | 30 |
| Fold Over Right Fly Facing | 20 |
| Serg Right Side | 6 |
| Aquire Left Fly Facing | 30 |
| Serg Left side and Base | 6 |
| Place Zipper on Left Facing | 45 |
| Place Right facing on Assembly | 30 |
| Lockstitch Zipper to Left Facing | 8 |
| Lockstitch Right Facing to Zipper | 8 |
| Fold Over Left Facing | 12 |
| Steam Press In Place | 90 |
| Sew Exterior Zipper Stitch (Double Needle thread) | 20 |
| Place Right Front Panel on Right Fly Facing | 30 |
| Lockstitch or zigzag Panel to Fly assembly | 14 |
| Sew Right and Left Front Panels together at crotch | 18 |
| Bartack base and corner of fly for high stress area | 12 |
| Sew Front Pockets onto Front Panels | |
| Double Stitch Pocket Lining to Front Panel top | 60 |
| Serg Pocket Facing | 24 |
| Lockstitch Lining to Facing | 28 |
| Fold and Press Coin Pocket | 12 |
| Chainstitch Coin Pocket to Pocket Facing | 18 |
| Serg Pocket Lining | 16 |
| Lockstitch ends of pocket Serging | 12 |
| Sew Back Half Together | |
| Sew Yoke to Back Panel Single Straight Stitch | 5 |
| Fold over and Steam Yolk Flat | 20 |
| Sew Yoke in place with Second straight Stitch | 4 |
| Place Back Halves together and straight stitch | 6 |
| Align Yokes and sew seam | 30 |
| Unfold and press back panels | 80 |
| Sew seam down in place, Lockstitch | 30 |
| Fold and press back pockets | 20 |
| Chainstitch top of pocket fold over | 24 |
| Place pockets on back panels | 6 |
| Double needle sew perimeter of back pockets | 22 |
| Sew decorative stitch on pocket | 24 |
| Rivet upper corner of back pockets | 90 |

| Operation Description | Time in Seconds |
|---|---|
| Merge Front and Back Halves | |
| Line up front and back crotch seams | 12 |
| Pin legs together at length | 28 |
| Flat fell Seam inside leg bottom to top and back | 10 |
| Position outside edges together | 18 |
| Serg Outside edge of both legs | 20 |
| Attach Waistband | |
| Fold waistband in half | 12 |
| Sew Ends vertically back from the edges | 16 |
| Sew along folded edge (single stitch) | 20 |
| Place waistband on pants inside out | 30 |
| Sew around perimeter | 24 |
| Place any labels in waistband | 12 |
| Trim zipper excess and stitch waistband down over them | 20 |
| Sew ends of waistband closed | 12 |
| Sew along bottom of waistband using gold thread | 24 |
| Attach Belt Loops | |
| Fold belt loop over | 10 |
| Stitch stock into tube shape | 12 |
| Iron Flat | 30 |
| Trim beltloops to length | 8 |
| Stitch Beltloop, fold over and stitch lower | 6 |
| Create Button Hole | |
| Use button hole sewing machine to create buttonhole | 12 |
| Hem Legs | |
| Turn Pantleg inside out | 36 |
| fold up hem | 6 |
| Single stitch hem around leg | |
| Turn rightside out and stitch with gold thread | |
| Repeat near base of hem for high quality look | 10 |
| Add Rivets | |
| Punch hole in pocket corners | 20 |
| Rivet pocket corners | 80 |
| Press Jean button in place through fabric | 20 |
| Total Transit Time (in Minutes) | 22.2 |

SYSTEM AND METHOD FOR AUTOMATED MANUFACTURING OF CUSTOM APPAREL

This application claims the priority benefit of U.S. provisional patent application Ser. Nos. 61/792,506 and 61/792,743, both filed on Mar. 15, 2013, and pending patent application Ser. Nos. 14/202,271 and 14/202,176, both filed Mar. 10, 2014, the contents of which are incorporated herein by reference in the entirety.

BACKGROUND OF THE INVENTION

Ready-to-wear apparel is typically manufactured in factories which produce large numbers of garments at a time. Bolts of fabric, typically laid out many layers at a time, are cut into pattern pieces, which are then sewn together in an assembly line fashion to produce garments. Although the garments are cut and sewn with the assistance of machines, the process is nevertheless labor-intensive, and includes manual movement of patterns, sewn garments, and operation of sewing machines and other kinds of equipment. Accordingly, many manufacturers prepare garments in low-wage countries to take advantage of lower labor costs for manual labor. While mass production of apparel can maximize throughput and provide significant economies of scale, mass production does not allow for personalization of a garment for a particular consumer beyond the selection of one of a handful of stock sizes. Rather, customers wishing personalized or custom-fit clothing must purchase a garment off-the-rack and then have the garment altered as they wish, or they must employ a tailor for manual production of the item. Both of these options are costly and time-consuming.

As clothing manufacturers are typically located in low-wage countries, there can be a significant period of time from when a buyer places an order to the time that the garments are delivered. Items purchased in bulk quantities are typically shipped by sea, thereby introducing significant delays and variability in the timeliness of delivery. Smaller lots can be shipped by air, although transportation costs then become a significant element of the garment's cost.

Clothing is typically manufactured in a factory in a massively parallel manual manner. That is, each item of equipment used to manufacture clothing is operated by hand, and there are large numbers of identical machines in parallel operation. The manual operation of the manufacturing machines does not require any digital connectivity between them, and the machines are therefore operated in a standalone manner and are not networked to a centralized computer control system for operation. Although certain sewing machines are "computerized" and can accept flash drives or similar devices, the computerization is generally limited to accepting upload of a limited set of infrequently varied machine configuration parameters, and these machines are not networked and cannot be operated remotely.

In addition to mass production in a factory, apparel can also be prepared by hand by custom tailoring, whether at home or commercially by a tailor or seamstress. Custom tailoring generally involves measuring a customer, having a customer choose style, fabric, and fit preferences, sewing the garment, and potentially adjusting the garment's fit during the course of one or more fittings. The resultant garment has a fit and style which is personalized to the customer's preferences, but it is typically costly due to the large amount of manual labor involved preparing the garment and the amount of time required on the part of the customer. Consequently, custom tailoring does not constitute a large segment of the apparel industry.

Current sizing of garments is usually undertaken with reference to body measurements obtained from anthropometric data surveys. For example, in 1939-1940, about 15,000 American women participated in a national survey conducted by the National Bureau of Home Economics. A technician took 59 body measurements of each volunteer, and the results were published in 1941 under the title "Women's Measurements for Garment and Pattern Construction". Using the data obtained from this study, the U.S. clothing industry developed national clothing sizing standards for women which were widely adopted by apparel manufacturers. Although these standards provide sizing measurements for women of tall, regular, and short heights, most individuals deviate from the mean fit model in body shape or other key dimensions, thereby yielding a suboptimal fit.

Recently, certain manufactures have implemented changes in clothing sizing, termed vanity sizing. As Americans have recently become heavier, these manufacturers have begun selling larger-sized clothing labeled with smaller size numbers, thereby appealing to customers' desires to consider themselves as having a slim body shape. As manufacturers generally do not move in lockstep with regard to changes in vanity sizing, garments having the same nominal size will typically have different fits, making direct sizing comparisons difficult.

Additionally, some customers also prefer garments that are looser or tighter than the ready-to-wear apparel which is available through most retail outlets or from online sellers.

There is, therefore, an unmet demand for methods and systems for economical and rapid automated manufacturing of personalized custom-fit apparel.

BRIEF DESCRIPTION OF THE INVENTION

The present invention is intended to address the above problems associated with creation of customized garments.

One aspect of the present invention is directed to a centralized command and control network system for the automated manufacture of a personalized custom-fit garment. The system comprises a centralized control system which oversees the manufacture of the garment. The centralized control system comprises memory, an input device, a processor, a network connection, and instruction code for an automated manufacturing process for creating a personalized custom-fit garment for a customer based on the customer's three-dimensional body shape and style and fit preferences.

The instruction code may comprise algorithms which enable the computer system to perform the corresponding actions. The instruction code can be located on a computer-readable storage medium which may be a hard drive, floppy drive, solid state drive, memory stick, CD, DVD, or any kind of magnetic, optical, or solid state device which can store data. The storage medium can be read-only, or it can have read-write capabilities for periodic updates or modifications to the computer instruction code.

The automated garment manufacturing system is to be understood as being substantially or fully automated after the system receives a complete order from a customer for a personalized custom-fit garment. After the customer has had his or her body scanned, and selected and personalized a garment design, the inventive manufacturing system will then manufacture the garment upon receipt of the order in an automated manner without requiring further substantive manual intervention. In a fully automated embodiment of the invention, no manual intervention or touch labor is involved during manufacture of the garment. That is, a human monitor is not needed to assist the manufacturing process.

When manufacturing certain kinds of garments, there may be particular steps which cannot be readily automated, for example, due to the nature of the manufacturing process or when using delicate materials/components. In such instances, a human monitor may assist the invention in placement or positioning of workpieces or garment components during manufacture of the personalized custom-fit garment. Such minor amount of touch labor will normally be less than two minutes per garment during the entire manufacturing process, and will typically be about one minute or less. Such minor amounts of touch labor during manufacture of a garment in accordance with present invention are still dramatically lower than the overwhelmingly manual processes currently used for manufacturing apparel.

The instruction code used in the invention can be configured for transforming digital pattern and design metadata into machine instructions for automated manufacture of the personalized custom-fit garment by manufacturing equipment and material handling equipment; sequencing the execution of the machine instructions, and communicating the machine instructions to the respective manufacturing and material handling equipment; manufacturing the personalized custom-fit garment by the manufacturing equipment and material handling equipment; and monitoring the manufacture of the garment.

The inventive system also comprises automated programmable manufacturing equipment networked to the centralized control system via the network connection. The manufacturing equipment is configured for assembling and stitching the personalized custom-fit garment from the digital pattern and design metadata.

The system also comprises automated programmable material handling equipment networked to the centralized control system via the network connection and configured for transporting the personalized custom-fit garment or its components through each step of the manufacturing equipment.

The programmable manufacturing equipment can comprise any kind of machine or device which is used during the manufacture of clothing. For example, the programmable manufacturing equipment can comprise machines such as the following:
 (a) fabric and yarn storage, inventory, and dispensing equipment;
 (b) fabric cutting equipment and fabric trimming equipment;
 (c) equipment for the application of fiducial markings using ink sensitive to wavelengths in the non-visible portions of the spectrum;
 (d) sewing equipment and knitting equipment:
 (e) belt looping equipment;
 (f) buttonhole creation and button sewing equipment;
 (g) riveting equipment;
 (h) embroidery equipment; and
 (i) finishing equipment.

The finishing equipment can be any kind of equipment used after manufacture to provide the garment in a ready-to-wear condition to the customer. For example, the finishing equipment can improve the look, performance, or feel of the completed garment, and may comprise washing, drying, and pressing equipment, such as a washer (conventional or stone washer), a dryer, and/or an iron. The finishing equipment can also comprise a garment wear station or stretching station.

The programmable material handling equipment can be any kind of machine or device which is used to transport a garment or workpiece or its components through the manufacturing equipment. For example, the material handling equipment can comprise one or more fabric, yarn, or garment handling machines selected from the group consisting of:
 (a) a multi-axis robotic manipulator;
 (b) an adjustable gripper and end effector;
 (c) a fabric guidance fixture;
 (d) an application device for placement of fiducial markings on fabric;
 (e) a light source for stimulating the ink to make it visible to detection; and
 (f) one or more machine vision systems configured for detecting the location of fiducial markings on fabric.

In one embodiment of the invention, the fiducial markings are applied using washable ink sensitive to wavelengths in the non-visible portions of the spectrum;

In an embodiment of the invention, the centralized control system can comprise a master controller which is networked by a data bus to local controllers situated at each programmable manufacturing and material handling equipment.

In an embodiment of the invention, the digital pattern and design metadata can comprise customer design style and fit preferences. For example, the design style and fit preferences can include customization such as:
 (a) customized pattern geometry;
 (b) pattern orientation relative to the stock material fabric direction;
 (c) pattern cutting and assembly instructions;
 (d) fabric type and color;
 (e) stitch type and thread color:
 (f) button, rivet, and zipper selection;
 (g) embroidery type; and
 (h) finish type.

Other examples of customizations available to customers may include the following:
 (a) fabric and fabric color selection;
 (b) thread selection;
 (c) choice of customized hardware;
 (d) embroidery selection and placement;
 (e) label placement or absence thereof;
 (f) design element placement or repositioning; and
 (g) choice of customized finishes.

Another aspect of the present invention is directed to a computerized method for the automated manufacture of a personalized custom-fit garment. The method can comprise the steps of receiving from a customer an order for the personalized custom-fit garment and design preferences as a digital pattern and design metadata; transforming the digital pattern and design metadata into programming instructions for programmable manufacturing and material handling equipment; converting the programming instructions into machine instructions for automated transport of the garment or its components through each step of the manufacturing equipment; sequencing the execution of the machine instructions, and providing the machine instructions in sequence to the respective manufacturing and material handling equipment; and manufacturing the personalized custom-fit garment by the manufacturing and material handling equipment in accordance with the machine instructions, and monitoring the manufacturing equipment and material handling equipment during manufacture of the garment.

In an embodiment of the invention, the digital pattern and design metadata can be used for visualization of fabric draping, fabric fit, and garment stress contours around a digital model of a specific body shape. In this manner, customers can see an image of their body wearing the desired design, and can adjust fabric draping, fit, and other preferences as they wish.

A digital pattern which is used in the invention may contain any kind of electronic data which may be needed to manufacture a garment in accordance with the present invention. For example, the digital pattern may comprise design parameters and manufacturing settings such as:

(a) a three-dimensional digital geometry of the pattern;
(b) a corresponding two-dimensional digital projection of the design;
(c) garment sewing and assembly machine instructions;
(d) fabric type and fabric orientation parameters; and
(e) choice and placement of finishes and hardware.

The finishes and hardware can be any kind of processes or items which are applied to the garment, for example, decoration or fastening. A non-limiting list of finishes may include specialty washes such as stone- or acid-washing, distress- or wear-patterns, and specialty fabric dyes. A non-limiting list of hardware may include rivets, buttons, zippers, snaps, hooks, hook-and-loop fasteners, elastic bands, stitch styles and spacings, custom labels, and embroidery.

Other aspects and advantages of the invention will be apparent from the description below.

BRIEF DESCRIPTION OF THE FIGURES

FIG. 20 illustrates an aspect of the invention wherein a centralized control system manages the command and control architecture connecting robotic manipulators and garment sewing equipment;

FIG. 21 illustrates exemplary equipment for use in preparation of a pair of jeans in accordance with an exemplary embodiment of the present invention; and FIG. 22 illustrates an exemplary sequence of computer instructions for stitching a pair of jeans and the corresponding amount of time for each step.

DETAILED DESCRIPTION OF THE INVENTION

Figure 1:
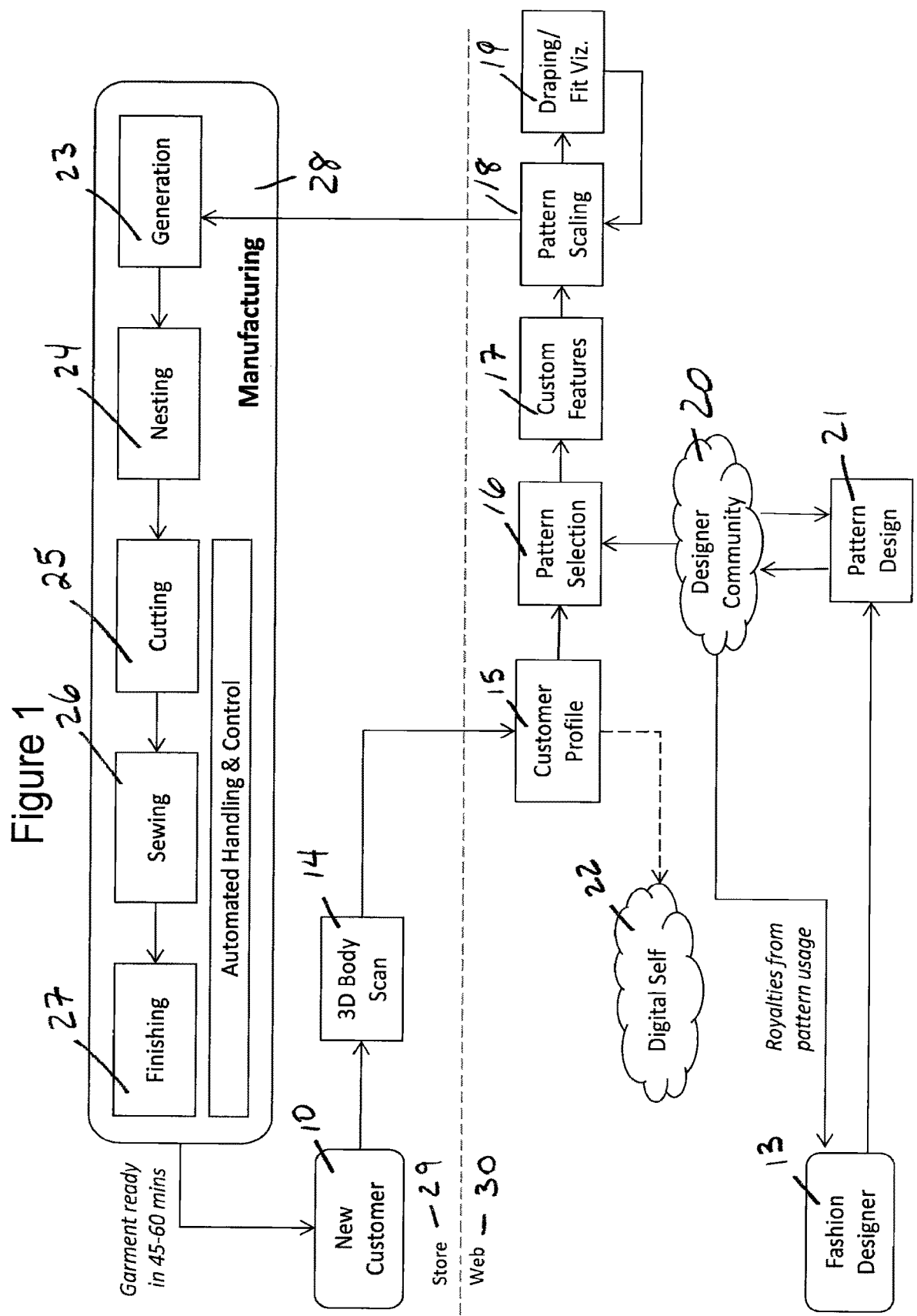
FIG. 1 illustrates a flow chart showing a process for preparing an article of clothing for a new customer in accordance with an aspect of the present invention.

An object of the present invention is to enable the fabrication of apparel tailored to particular customer preferences with a high level of flexibility and customization, comparable to that of conventional hand tailoring, but with the ability to utilize a wide range of digitally-represented clothing patterns to manufacture the personalized custom-fit garments on significantly shorter timelines.

A further object of the invention is to improve upon the level of automation that is customarily present in high-volume production facilities by automating material handling among manufacturing work steps and by providing a centralized control system for the manufacturing and material handling equipment. The invention is aimed principally at low- to medium-volume production and consequently is geared toward maximizing the flexibility and range of customization rather than production rate.

The automated manufacturing of apparel in accordance with the principles of the present invention provides distinct advantages over mass production and hand tailoring techniques. The invention eliminates the need to maintain physical stock sets or digital stock sets of patterns for use to prepare garments. That is, the invention does not require maintaining paper patterns or standardized digital designs in multiple discrete sizes as do mass producers or hand tailors. Rather, a three-dimensional representation of each customer's body is obtained by a scanner, and digital designs are electronically fitted to the customer's body shape for enhanced fit. The invention also provides for realistic visualization of draping and fit. While designers currently use fit and draping visualization with pattern design software to refine clothing designs for an entire production line, the invention uses fit and draping visualization in conjunction with body scan measurements to enable customers to adjust fit and drape preferences before a garment is manufactured, thereby customizing the garment's fit to their own tastes and body shape.

The invention also avoids the need to lay out paper patterns on fabric, or to plot the layout of patterns on potentially hundreds of plies of fabric as performed in mass production garment factories. Rather, the invention utilizes auto-nesting software for each and every custom pattern to determine the optimal arrangement of digital pattern pieces on fabric for subsequent cutting and thereby minimizes fabric waste while preserving flexibility.

The invention also eliminates manual cutting and handling of fabric. On the factory floor, manual labor is required to move fabric plies into position and to cut out pattern pieces, while hand tailoring requires precise manual cutting of pattern pieces. The present invention provides for an automated manufacturing process which does not require manual manipulation or handling of fabric or garments during production.

Advantageously, the invention also eliminates the need to manually move articles from one work station to another, for example, by physically moving garments to the next station, possibly located in a distant part of the workroom, or with the assistance of an overhead conveyor. The use of low-cost offshore labor typically does not create significant incentives for manufacturers to automate production. In contrast, the invention substantially eliminates the use of touch labor in material handling between machines. The use of robotic manipulators for fabric and garment handling substantially reduces touch labor in manufacturing and thereby reducing repetitive stress injuries in workers.

The invention also eliminates the need for manual sewing and garment preparation. Whether mass produced in a factory or prepared by hand tailoring, the manufacture of clothing normally involves manual operation of sewing machines and other manufacturing equipment. In the case of Mass production, the production lines are typically massively parallel operations involving many workers assembling garments. In contrast, the present invention eliminates the need for manual operation as the entire processing is done in an automated manner involving centralized command and control of garment manufacturing equipment and material handling equipment. Consequently, the invention provides for a short manufacturing time of about 15-20 minutes for a garment (excluding finishes), in contrast to current mass producers for whom manufacturing transit time is a metric of lower significance than production rate.

Advantageously, the inventive method permits a garment to be delivered in a short amount of time as compared to current manufacturing procedures such as mass production and hand tailoring. In one embodiment, the total time to deliver a garment (comprising manufacturing time and finishing time) is about an hour, although this amount of time will vary depending on the garment to be manufactured and the finishes selected. The automated nature of the inventive manufacturing method enables the garment to be fabricated at or near the point of sale thereby reducing the delivery time to the customer as compared to shipping of mass-produced items from low-wage countries.

The digital garment designs available for selection by customers comprise designs obtained from an associated community of designers, that is, from designers who wish to contribute designs for use by the invention. The members of the designer community can communicate via a website to provide new designs and comments regarding existing garment designs. Advantageously, a differentiating attribute of the designer community is that it affords amateur designers the opportunity to access manufacturing and direct-to-customer retailing through the seller without having to work with existing big manufacturers, retailers, and labels. Accordingly, the invention dramatically it lowers the barrier to participation in the marketplace for amateur designers.

In an embodiment of the invention, the website provides a discussion forum and online tools and software to designers for creation of digital design patterns, and encourages collaboration, sharing, and co-design of digital design patterns. The website may also provide features to enable prize-based design competitions, display of design popularity and usage statistics, and design and designer peer reputation scores.

The designer community website may consist of online forums, message boards, design, visualization, and collaboration tools that enable amateur and professional designers to contribute design patterns.

When a customer selects a designer's digital design pattern to be used for manufacturing a personalized custom-fit garment, the designer can be paid a royalty as compensation for having contributed the design. In this manner, designers are compensated when their designs are selected by customers, and there is no up-front payment to designers when the customer selects their designs for manufacture. Alternatively, the designers can receive a single lump-sum payment if the manufacturer chooses to carry their clothing design as a stock design.

Customers may be provided the opportunity to customize their garment in any manner permitted by the designer, seller, or manufacturer. For example, a customer may be provided with design options such as a choice of fabric and fabric direction. The fabric available for selection by customers can be manufactured from woven or non-woven natural fibers, synthetic fibers, or a combination thereof.

The invention is not limited to the preparation of garments by sewing woven or non-woven fabrics, and the principles of the invention are equally applicable to the preparation of garments by three-dimensional printing or other forms of additive manufacturing, adhesive bonding, or knitting from yarn.

For ease of discussion, the term "sewing machine" will be used to refer to any, machine which is involved in the manufacture of a garment. Consistent with the invention and unless otherwise qualified, a sewing machine may be a conventional stitching machine, or it may be a riveter, embroidery machine, bar tacker, serger, or button holer, or finishing machine, or the term may include printing, adhesion, or knitting machines in embodiments of the invention where the garment is manufactured by means other than sewing.

The automated material handling equipment used in the present invention can be generally classified as either sensing equipment, fixturing and guidance equipment, or pickup and transport equipment. Each of these aspects of the invention will now be discussed in turn.

Sensing can be understood as the steps the automated material handling takes to determine where and when to undertake the next step in the manufacture of a garment. For example, sensing equipment can determine where to cut, sew, trim, rivet, hem, serge, embroider, or otherwise engage in producing a garment. In one embodiment, fabric can be marked with ink which is sensitive to non-visible portions of the spectrum (for example, ultraviolet light) to provide fiducial marks on the fabric. The location of these fiducial marks can be determined with sensors or scanners, and the manufacturing equipment can, for example, grasp, cut or sew the fabric along fiducial marks. In another example, if a fabric has a pattern, for example, white daisies on a yellow background, the invention can sense the location and direction of the daisies and can position the fabric in the correct orientation for preparation of the garment.

Fixturing and guidance refers to the use of static hardware fixtures or guides to move, position, or coax a fabric, workpiece, or garment into the correct position for subsequent action by the manufacturing equipment. For example, static guide jigs can be used to position fabric as it is fed by a robotic manipulator through a sewing machine. The fixtures ensure that the workpiece is correctly positioned and can correct for any minor misplacements by the material handling equipment.

Pickup and transport by the automated material handling equipment involves movement of fabric, workpiece, or garment to another location for subsequent activity. The pickup and transport can encompass any convenient means of placing a workpiece from one manufacturing station to another, or for changing the position of a workpiece at the same station, for example, to replace one cuff of a pair of jeans at a sewing machine by another cuff. The pickup and transport equipment can employ devices or technologies such as vacuum, clips, pincers, and clamps to pick up a garment and to move it to another location. Advantageously, the automated manufacturing process provided by the present invention dramatically decreases material handling time and thereby increases manufacturing throughput.

The invention considers the characteristics of different fabrics during manufacture of a garment. For example, wool, denim, cotton, polyester, and silk have different physical properties and these differences will be taken into account when selecting fixtures and handling hardware, and developing computer instructions for the manufacture and material handling of the garments and workpieces.

The programmable material handling equipment utilized in the present invention provides substantially all of the garment movement functions. These machines generally comprise CNC (computer numerical control) technology to permit computerized control.

Automated material handling in accordance with the invention can be generally divided into the following six procedures. In each case, the underlying technology can generally be purchased commercially or it can custom-designed:

(a) pattern marking;
(b) pattern cutting;
(c) fabric pickup and handling;
(d) fixturing and fabric guidance;
(e) sewing; and
(f) finishing.

A. Pattern marking involves the placement of fiducial lines or other markings on to the fabric to indicate where fabric should be grasped, picked up or otherwise handled, sewn, trimmed, embroidered, riveted, etc. These markings are indicative of specific locations on the fabric pattern and the relevant edge, and assist in positively identifying individual edges and grasping locations later during the manufacturing process. The markings can be applied using any convenient means, such as via a marking pen having ink which is sensitive to wavelengths in the non-visible portions of the spectrum. Many CNC tables, for example those supplied by Aeronaut Automation (Terrey Hills, Australia) can be fitted with multi-tool operating heads for installation of markers or pens.

B. Pattern cutting involves cutting pattern pieces from a bolt of fabric. The pattern pieces can be cut using a variety of cutting tools, which are generally specific to the fabric type, fabric thickness, and cutting speed. For example, the pattern cutting tools can include drag knives, rolling knives, reciprocating knives, or lasers. The automated cutting equipment used in the invention provides for rapid preparation of patterns even though each customer's design style and fit preferences will cause generation of unique patterns for each garment produced. Manufacturers of equipment for pattern cutting include Eastman Machine Company (Buffalo, N.Y.), Gerber Technology (Tolland, Conn.), and Aeronaut Automation (Terrey Hills, Australia). Pattern cutting will also involve nesting pattern shapes to minimize scrap fabric. Nesting computer programs are available from various manufacturers, one example of which is patternPRO, distributed by Eastman Technologies. The nesting software can comprise rules which take into consideration fabric features such as fabric direction (if the fabric has a printed or woven design).

C. Fabric pickup and handling involves the movement of fabric from one work station to another. Examples of fabric pickup and handling equipment include vacuum fabric grippers, pin grippers, and reconfigurable robotic handlers. In addition to placement of fabric, the invention also takes into account the minimum number of picking points which are necessary for pickup of a pattern piece or garment without wrinkling. Examples of vacuum grippers and pickers include those manufactured by Festo Belgium NV (Brussels, Belgium). In certain embodiments of the invention, the fabric pickup and handling equipment can be custom-designed for use in moving particular kinds of pattern pieces or garment types. The fabric grippers and pickers can be installed on robots or robotic manipulators such as those manufactured by Rethink Robotics (Boston, Mass.), Redwood Robotics (San Francisco, Calif.), or Kawada Industries (Tokyo, japan). The fabric pickup and handling equipment may have any kind of structure suitable for movement of fabric, garments, and workpieces during manufacture.

D. Fixturing involves the accurate positioning of fabric, garments, or workpieces with the assistance of guidance fixtures or static guide jigs so that the workpieces can be sewn, riveted, embroidered, or otherwise worked on during manufacture. The guidance fixture facilitates automated material handling and, if a workpiece is imprecisely placed in a machine, the guidance fixture can urge the workpiece to move into the proper position for the next manufacturing step, thereby enabling a workpiece to be accurately fed into a machine. Currently, sewing machine operators implement static fabric guides to properly orient fabric as it is fed into a sewing machine, and an example of such a guide is a Jean-A-Ma-Jig, manufactured by Prym Consumer USA Inc. (Spartanburg, S.C.). The specific configuration of the guidance fixtures used in the invention will vary depending on the garment and manufacturing step. Fabric guidance refers to the robotic positioning of a work piece in the manufacturing equipment. The invention implements a closed-loop vision feedback system in conjunction with sensors placed on the manufacturing equipment.

Fixturing also involves the use of a centralized command and control system (further described below) which provides each local automated programmable manufacturing equipment and automated programmable material handling equipment with relevant stitch and workpiece movement instructions for manufacturing the garment. The command and control system coordinates the start and stop of the sewing machines and other equipment during manufacture. The central controller is networked over a network connection to a local control attached to each machine or piece of equipment that translates commands that it receives into the native format for control inputs to that machine, thereby ensuring that the manufacturing process proceeds in a controlled and reproducible manner.

Fabric guidance refers to the robotic positioning of a work piece in the manufacturing equipment. The invention implements a closed-loop vision feedback system in conjunction with sensors placed on the manufacturing equipment. For example, sewing machines can be equipped with on-board sensors which detect the presence of fiducial marks or pattern directions, and these sensors instruct the sewing machine to stitch along certain fiducial lines, or instruct the machine to sew along a guide fixture until the sensor detects a fiducial line. In addition, the robotic manipulators can be equipped with sensors to detect where to locate a pattern piece and the direction it should be placed at the next work station. Consequently, the feedback feature permits the manufacturing equipment to constantly sense the presence (or absence) of fiducial markings and to provide information back to the central controller, rather than following manufacturing instructions in an open-loop manner. An example of a manufacturer of automated production systems possessing some of these capabilities is KUKA Aktiengesellschaft (Augsburg, Germany).

E. Sewing refers to the mechanized securing of two fabric pattern pieces with a thread and needle. Sewing can also refer to the use of a thread to the secure the free edge of a cut fabric. A key aspect of sewing quality involves the ability to precisely control the relative feed rate and orientation of adjacent patterns into the sewing machine.

F. Finishing involves the placement and removal of a near-finished garment into washing, drying, or other finishing equipment that provides for, e.g., specialty washes, distress, or wear finishes. The placement and removal can be accomplished with equipment as described in items (C) and (D) above.

The centralized command and control system of the present invention parses out required tasks to all the various machines under its control, as well as coordinates the work flow. In many instances, these CNC machines have a low degree of machine intelligence, with only simple microcontrollers present onboard. CNC machines may have computer circuitry which permits them to accept a single file, for example, via a USB drive or from a floppy drive. The present invention networks these machines to the central command and control system via a local controller so that the manufacturing equipment, having different levels of machine intelligence and disparate native command languages and input data formats, is controlled through a single architecture.

The controller system may comprise a conventional computer having a processor, an input device such as a keyboard or mouse, memory such as a hard drive and volatile or nonvolatile memory, and computer code for the functioning of the invention. The computer may also comprise a programmable printed circuit board, microcontroller, or other device for receiving and processing data signals such as those received from the local controllers, programmable manufacturing equipment, programmable material handling equipment, and robotic manipulators.

The computer system may be a conventional computer which is pre-loaded with the required computer code or software, or it may be a custom-designed computer. The computer system may be a single computer which performs the steps of the invention, or it may comprise a plurality of computers, such as a server/client. In certain embodiments, a plurality of clients such as desktop, laptop, or tablet computers can be connected to a server such that, for example, multiple customers can enter their orders for personalized custom-fit garments at the same time. The computer system may also be networked with other computers over a local area network (LAN) connection or via an Internet connection. The system may also comprise a backup system which retains a copy of the data obtained by the invention.

A client computer can have its own processor, input means such as a keyboard, mouse, or touch screen, and memory, or it may be a dumb terminal which does not have its own independent processing capabilities, but relies on the computational resources of another computer, such as a server, to which it is connected or networked. Depending on the particular implementation of the invention, a client system can contain the necessary computer code to assume control of the system if such a need arises. In one embodiment, the client system is a tablet or laptop. For example, a customer in a retail store can be given an Apple iPad tablet for placing an order and visualizing the personalized custom-fit garment to be manufactured. The iPad or other tablet or laptop computer can be in wireless communication with the server, which would accept and process the order.

The components of the computer system may be conventional, although the system will typically be custom-configured for each particular implementation. The computer system may run on any particular architecture, for example, personal/microcomputer, minicomputer, or mainframe systems. Exemplary operating systems include Apple Mac OS X and iOS, Microsoft Windows, and UNIX/Linux; SPARC, POWER and Itanium-based systems; and z/Architecture.

The computer code to perform the invention may be written in any programming language or model-based development environment, such as but not limited to C/C++, C #, Objective-C, Java, Basic/VisualBasic, MATLAB, Simulink, StateFlow, Lab View, or assembler. The computer code may comprise subroutines which are written in a proprietary computer language which is specific to the manufacturer of a circuit board, controller, or other computer hardware component used in conjunction with the invention.

Although CNC (computer numerical control) machines have been previously known to be programmable, such machines were always manually controlled, and these machines have not been networked or interfaced to a centralized controller. The present invention provides local controllers or adapters which have a centralized network programmable data architecture that can upload CNC instructions to each machine rapidly without requiring human contact or manual control, and without requiring manual input of data or control instructions such as via USB memory stick or CD rom drive. The control system of the present invention also provides for activating the manufacturing equipment in the correct sequence, whereas the prior art requires manual manipulation such as pushing buttons to start or operate the manufacturing equipment. Such local and master controllers are commercially available from various manufacturers. The programming of the control system will generally be dependent on the specific implementation and embodiment of the invention.

In certain embodiments of the invention, a human monitor may be present to oversee the manufacturing processes and to resolve any manufacturing errors or faults. Nevertheless, the monitor will not be substantially participating in the manufacture and therefore will not routinely need to move or feed work pieces or operate the manufacturing equipment except for unusual or complex operations, or for resolution or remediation of exceptions and faults.

The digital design patterns which are used by the invention to manufacture clothing can employ any kind of file format which is used in the fashion industry. For example, the digital design patterns can be stored in a proprietary format, DXF format, XML format, or other format for use by the invention.

The invention can be used to prepare any kind of garment. For example, the garment can be a pair of jeans, a pair of pants, shirt, blouse, vest, suit, dress, skirt, undergarment, hat, purse or bag, and shoes.

The present invention will now be discussed with reference to the Figures, wherein like figure reference numerals correspond to like elements.

The following discussion exemplifies the principles of the present invention by reference to the manufacture of a pair of jeans. However, it is to be understood that the invention is equally capable of manufacturing other articles of clothing, such as (but not limited to) pants, shorts, boxers, shirts, blouses, scarves, and dresses. The invention can be used to prepare clothing for customers of any age or gender, and the invention is not limited to the preparation of clothing for a particular age or gender. For example, the invention can be programmed to prepare women's jeans, children's shorts, and men's boxers.

In certain embodiments, it may be advantageous for the system to manufacture only a single garment type in order to obtain efficiencies in production. In other embodiments, the invention can be programmed to prepare multiple garment types in order to provide additional marketing opportunities to customers.

In order to minimize the footprint of the invention in a retail store, portions of the inventive system can be located outside the customer-accessible part of the store. For example, the body scanner can be located in the front of the store, while the garment preparation equipment can be located in the rear of the store or the basement. Alternatively, store owners wishing to show the high-tech nature of the invention to customers may prefer to locate all the equipment in a customer-visible location so that customers can watch the garment be sewn while they wait.

An alternative instantiation of the invention is for the automated manufacturing line to be placed in a regional microfactory instead of a retail location. Such microfactories would be significantly smaller than traditional mass production facilities and would specifically cater to the product demand of a particular region or metropolitan area. A garment manufactured in a regional microfactory could be delivered to the customer within hours of an order being placed or overnight.

FIG. 1 is a flow chart illustrating an exemplary process for preparing an article of clothing in accordance with an aspect of the present invention. The figure illustrates the steps which take place when a customer enters a store for purchase of an article of clothing. In order to minimize customer waiting time, the components of the invention can be located in a single location, such as a retail store, so that customers can obtain the garments they ordered as soon as the garments have been sewn.

Upon entering a store, a new customer 10 would enter have his or her body scanned by a non-contact active whole-body scanner for preparation of a 3-dimensional digital representation 14 of the customer's body. Examples of whole-body scanners suitable for use by the invention are white light scanners, structured white light scanners, eye-safe laser scanners, and millimeter wave imaging scanner. Whole-body scanners are known in the art and are available from manufacturers such as Cyberware, Inc., Monterey, Calif. (model WBX white light scanner); Breukmann GmbH, Meersburg, Germany (model bodySCAN structured while light scanner); Vitronic Machine Vision Ltd., Louisville, Ky. (model Vitus 3D Bodyscanner XXL, eye-safe laser scanner); and Unique Solutions, Dartmouth, Nova Scotia, Canada (model Intellifit millimeter wave RF scanner). Each vendor typically provides specialized software for converting a 3-dimensional body scan into a point cloud. Depending on the scanner technology and the scanner manufacturer's recommendations, customers may be able to have their body scanned while wearing their street clothing, or they may be asked to wear close-fitting garments so that the scanner can obtain accurate data. Examples of software programs which provide for the extraction of body measurements from point clouds obtained during three-dimensional body scans include Bodymetrics (San Francisco, Calif.).

The software used by the present invention contains algorithms for scaling a selected digital pattern to the customer's body shape. The software extracts sizing parameters from a three-dimensional point cloud obtained from the customer's body scan, and parametrically scales the digital pattern to adjust the shape and fit of the garment to the customer's body shape and size so that the resultant personalized custom-fit garment is manufactured to customer preferences.

While body scanners have been used in the past, their utility has been limited to standalone validation of selected measurements in conjunctions with traditional manufacturing processes. Although body scanners have also been used to confirm that garments are being made to specifications, before the present invention, it has been previously unknown to combine body scanners with a full garment customization and automated custom manufacturing process. In contrast, the use of body scanners by the present invention is integrated with the design process to parametrically size digital garment designs to obtain digital patterns which are personalized to the customer's body shape.

Once the body scan is complete, the customer's profile 15 is created. The profile can include any kind of information that the manufacturer or store may wish to contain, such as customer preferences, three-dimensional digital model of body shape and history thereof (for long-term repeat customers), order history, shipping address, and billing information. The customer profile can be used prepare a three-dimensional digital self 22 of the customer which can be stored for later retrieval so that customers can make subsequent purchases without having to have their bodies re-scanned.

After the customer creates a profile, he or she would then be asked to select a particular pattern 16 for the garment to be custom-sewn. The pattern can consist of any kind of digital information required to prepare the desired garment. The patterns can be stored in a database, data table, or other computerized repository. The set of patterns can be refreshed periodically so that infrequently-used patterns are removed and replaced with new styles. The patterns for selection can be shown, for instance, as rotating three-dimensional holographic projections, models on a computer screen, or photographs of finished garments.

Once the pattern is selected by the customer, the customer would then be able to select custom features 17 for tailoring the garment to his or her personal tastes. For example, the customer may be given the option to select fabric color, type of decorative stitching on a pocket, presence or absence of rivets, and looser or tighter fits around specific parts of the customer's body. Certain designers may wish to maintain look of their brands by limiting the customization options available to customers. In certain embodiments of the invention, the invention can comprise computer code to allow a customer to see in real time how his or her customized garments would look around the customer's specific body shape prior to manufacture. The invention also allows for display of a dimensionally-accurate three-dimensional representation of the personalized custom-fit design to a customer, and rapidly updating the three-dimensional representation as the customer selects style and fit preferences.

Once the customer is satisfied the customized design for his or her garment, the inventive system would then adapt the design to the customer's body measurements to obtain a personalized custom-fit design 18. That is, the system would scale the customized design to the customer's three-dimensional body measurements. This process may also involve updating the custom-fit design in real time to show the customer the draping or fit 19 of the garment's fabric on the customer's body. Examples of software programs and manufacturers which provide for realistic draping and fit visualization of digital patterns include Optitex 3D Virtual Prototyping by Optitex (New York, N.Y.); Vstitcher by Browzwear Solutions Pte, Ltd. (Singapore); and Deviron LLC (Ithaca, N.Y.).

In accordance with the invention, a customer's body scan will result in a three-dimensional point cloud which can be converted into a digital representation that is augmented with data provided by the manufacturer or designer, and as modified by a customer's customizations, to result in two-dimensional representation of a pattern representing the pattern pieces to be cut from the fabric and sewn to manufacture the garment. Depending on the customer's style preferences, the algorithms of the invention may need to incorporate varying degrees of modifications of the three-dimensional digital representation. Once the customer has selected the desired customizations, the algorithms will convert the digital representation into a two-dimensional pattern file, which may optionally comprise garment sewing instructions and control instructions for the manufacturing and material handling equipment. The inventive system will convert the customized digital pattern into specific CNC manufacturing instructions for each machine as well as the order of operations and the manufacturing sequence. The seller may wish certain standardizations, such as stitch spacing, stitch width, or custom detailing so that customers can identify a garment as having been manufactured by the present invention.

In order to increase the number of patterns available to customers, fashion designers 13 such as those part of a designer community 20 can use pattern design tools 21 to prepare patterns for upload. The pattern design tools can include software which simulates the look and drape of a particular article of clothing on a body. Such pattern design tools are known in the art, for example, Click & Sew by Wild Ginger; Dress Shop Pro and My Pattern Designer by Livingsoft; Garment Designer by Cochenille; and Pattern Design Software by Optitex. The manufacturer or seller of the invention can specify a particular software type for use, or the manufacturer or seller can allow for open source pattern design tools or file types as are known in the art. The manufacturer can optionally arrange for fashion designers to purchase commercially-available pattern design tools at a favorable price, or can make free pattern design tools available via download or as a hosted online service from a website.

The seller can also provide for a website for the designer community to encourage designers to share or co-design digital pattern designs, i.e., "crowdsourcing" and to allow designers and members of the public to vote on preferred designs.

A designer submitting a new design can be paid outright for his or her design, or the designer can be paid on a royalty basis after his or her design is selected by a customer for preparation of an order. A seller may wish to limit the number of available patterns for a particular garment type in order to streamline customer choice, or the seller can wish to have a wide selection of patterns for maximal customer choice. Decisions regarding selection and refreshing of patterns and designer payment are not critical to the scope of the invention and can be made by the seller as deemed appropriate.

Designers who submit patterns can be professionals who work in the fashion industry, or they can be amateur designers who are not full-time practitioners of the art, Advantageously, the invention permits designers of any scale or experience level to provide their own digital pattern designs. If designers are paid a royalty only when their digital designs are selected by customers, rather than when uploaded to the system, the designers are incented to provide their most appealing designs, rather than designs which may be minimally acceptable by the public. Depending on the seller's marketing preferences, the seller may provide a large number of possible designs to customers for selection, or the seller may provide a limited number designs to avoid overwhelming customers with an excessive number of choices.

In one embodiment, the invention advantageously permits a seller to essentially eliminate the barrier-to-entry for new designers to contribute designs, and the invention does not require guaranteeing designers with minimal revenues and does not require upfront retainer costs or investment in a particular designer if that designer's styles are later found to be commercially unsuccessful.

Manufacturing of the selected design can be carried out as illustrated in Box 28. After customization of the personalized custom-fit pattern is complete, the system then generates a digital pattern 23 for use in manufacturing the garment.

After the digital pattern is prepared, the system uses nesting software 24 to lay out the pattern pieces on the fabric. The nesting software determines the optimal arrangement of the pattern pieces for the garment so that the pattern pieces can be cut 25 with a minimum of waste fabric.

Once the pattern pieces are digitally nested onto the fabric, the automated handling and control module of the invention undertakes the cutting 25, sewing 26, and finishing 27 of the personalized custom-fit garment from the digital pattern. This procedure involves marking the fabric into individual pattern pieces and applying fiducial markings, cutting the fabric into the pattern pieces, sewing and stitching the pieces to form the garment, and finishing and cleaning the garment so it is wearable by the customer. The assembly and stitching of the garment is entirely automated and there is minimal if any monitoring required by on-site personnel such as retail employees. As shown in FIG. 1, the garment can be cut, sewn, and finished in under an hour while the customer waits, thereby increasing customer satisfaction.

While initial scanning of a customer's body to obtain the three-dimensional body scan will generally be done in a retail location 29, the invention allows for certain steps to be carried out online via a web interface 30. That is, once a customer's three-dimensional body measurements are stored in the customer profile, the invention can retrieve this stored information and use it to prepare additional personalized custom-fit garments in a largely automated manner. The web interface can be the means that customers or retail employees interact with the invention to prepare personalized custom-fit garments.

Although the invention has been discussed with reference to cutting pattern pieces from fabric and stitching the pattern pieces to form the garment, the invention is equally applicable to preparation of bonded, printed, or knitted garments, and the same principles of the invention are applicable to such embodiments.

Figure 2:
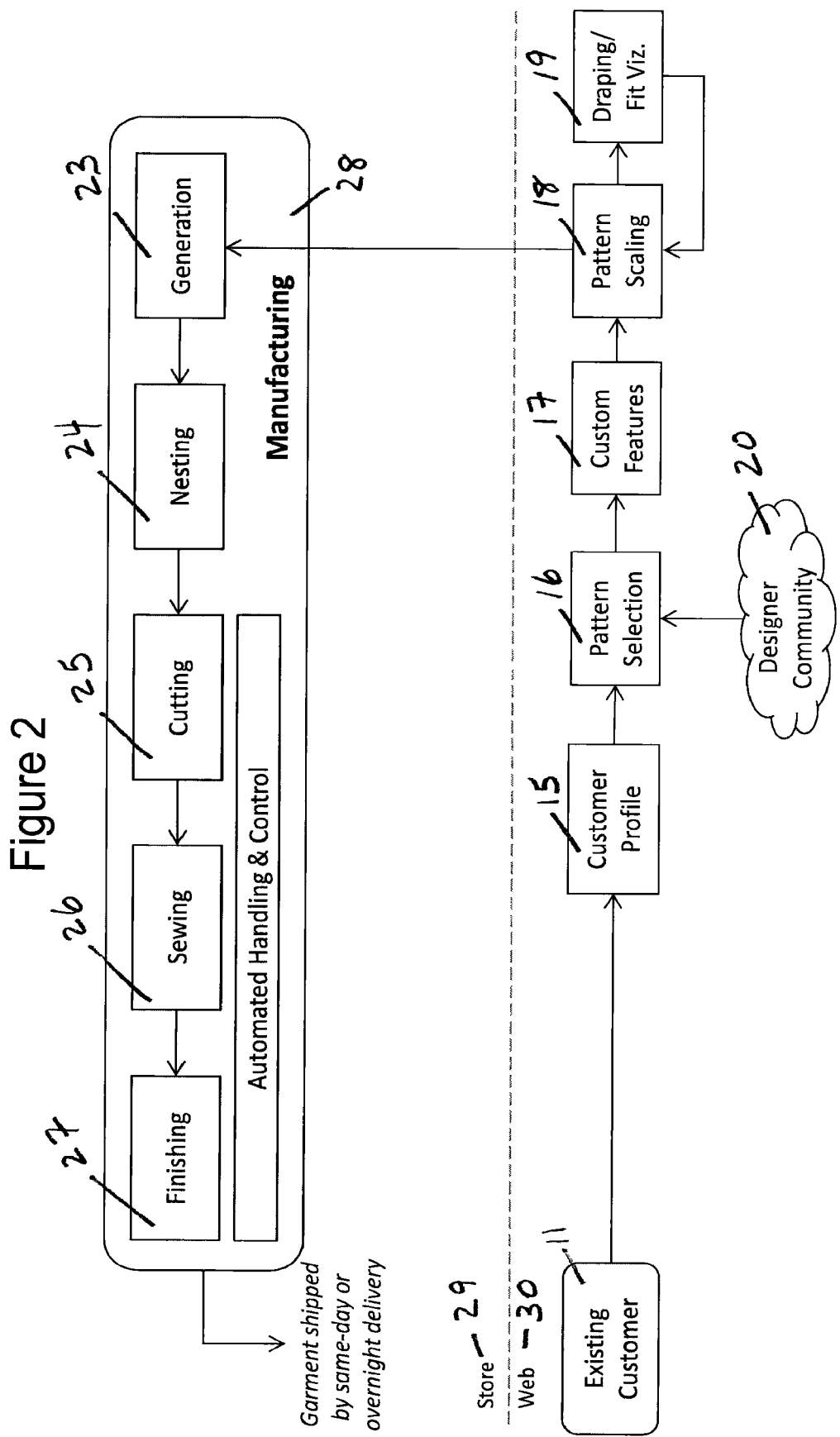
FIG. 2 illustrates a flow chart showing a process for preparing an article of clothing for an existing or previous customer in accordance with an aspect of the present invention.

FIG. 2 illustrates a flow chart showing a process for preparing an article of clothing for an existing customer, that is, a customer who has already purchased a personalized custom-fit garment or has a stored customer profile with the retail store.

Existing customers 11 wishing to make purchases of additional garments may omit the step of obtaining a new body scan and can proceed directly to retrieval of their customer profile 15 which contains the earlier body scan. After the existing customer retrieves his or her customer profile 15, the customer can then order additional custom-fit garments as described above. Such features allow for improved customer retention and expand the marketing scope of the invention to new potential customers. If the customer is not in the retail location and orders the garment via the web interface, the finished garment can be sent to the customer for same-day or overnight delivery.

Sellers may provide a customer with an incentive to rescan the customer's body and obtain updated three-dimensional body measurements at a predetermined time or upon passage of a pre-determined period of time. Incentives may include customer loyalty discount programs or sales opportunities through linkages to a customer's online account with other providers, such as Facebook, Google+, or with retailers and department stores. Such linkages may be employed to derive information on a customer's birthday, anniversary, or other significant life events or lifestyle trends such as (but not limited to) weight loss, weight gain, or having a baby.

The pre-determined time may be the customer's birthday, anniversary, reaching a particular sales quantity (for example, purchase of three pairs of jeans over the course of a year) or sales quantity (for example, purchase of $500 of merchandise over the course of a year), or any other event as may be deemed appropriate or desirable by the seller The passage of the pre-determined period of time can be any amount of time deemed appropriate by the seller, for example, three months, six months, or twelve months since the time of the previous body scan.

A seller can also link a customer's profile to an online or store account, and provide the customer with an incentive to rescan the customer's body using information obtained from the linked account. For example, if the customer enters a wedding date into his or her account with a local department store, that wedding date can be retrieved by the seller and entered into customer's profile with the seller of the invention, and the customer can be provided an incentive on his or her wedding anniversary to rescan his or her body. The linked account can be any retailer with whom the seller has a linking agreement.

FIG. 2 also shows that upon selection 16 of a particular pattern, the designer of that pattern, who is part of the associated designer community 20, would receive a royalty payment. The nature of the royalty payment would have been previously determined by agreement between the manufacturer and the designer.

Figure 3:
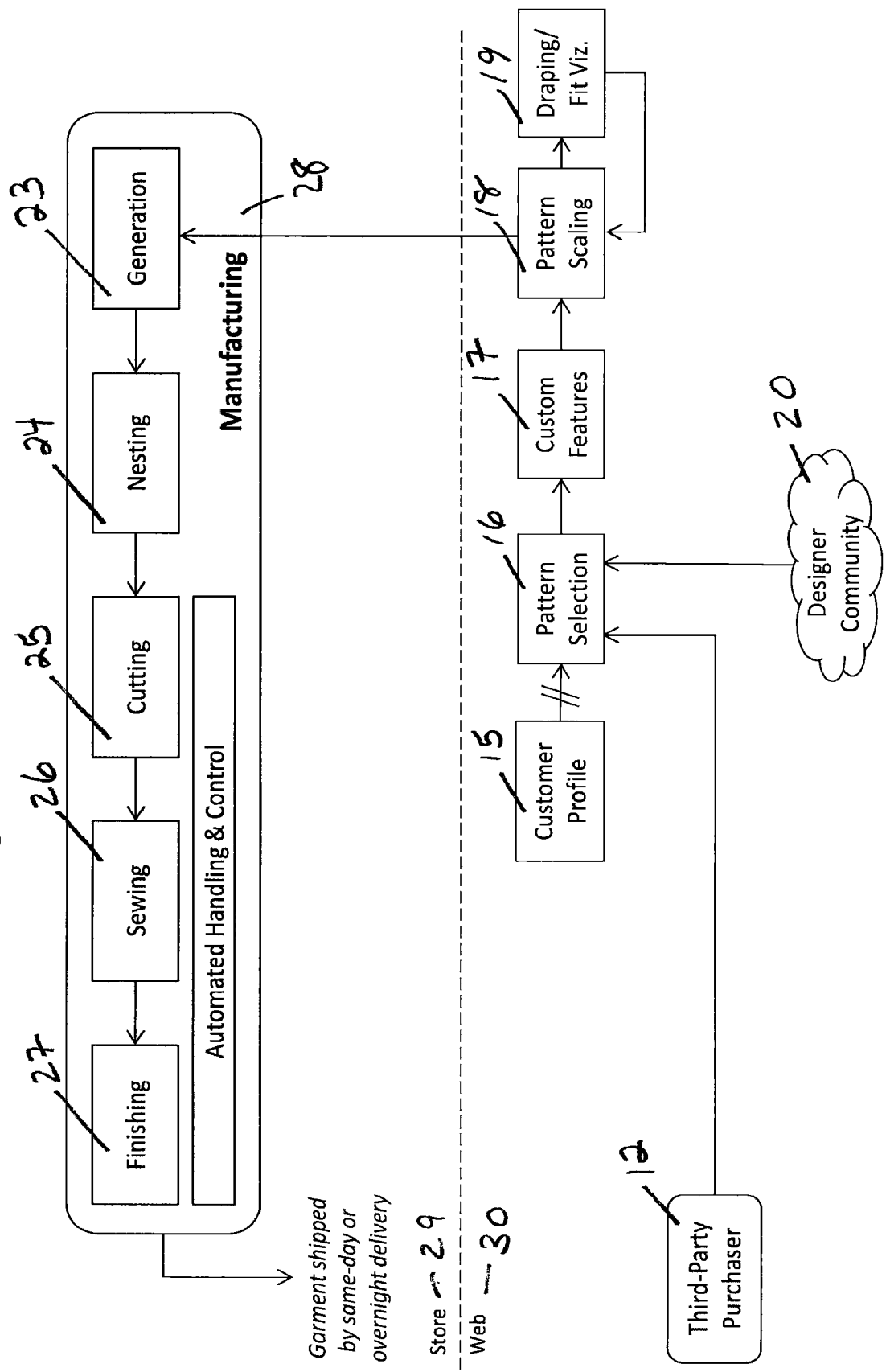
FIG. 3 illustrates a flow chart showing a process for preparing an article of clothing for a third-party purchaser in accordance with an aspect of the present invention.

FIG. 3 illustrates a flow chart showing a process for preparing an article of clothing for a third-party purchaser. FIG. 3 shows that third-party purchasers 12 wishing to purchase garments for a friend or relative can do so using the earlier body scan data privately stored in the profile. Due to privacy concerns, a seller may not wish to provide third parties with direct access to a customer's body scan data. Accordingly, sellers can prevent third parties from obtaining the measurements themselves, but sellers can still allow indirect access to the stored information without display of measurements so that these third party purchasers can purchase garments for their friends or relatives. The third parties can purchase garments online 30 via a web interface, or by visiting the retail store 29. The web interface can provide online customers with same custom ordering options as offered to retail customers. That is, the online customers can select a pattern, customize the pattern to their preferences and previously-stored body measurements, and place an order for the inventive system to manufacture the clothing in an entirely automated manner. As in FIG. 2, upon selection 16 of a particular pattern, the designer of that pattern, who is part of the associated designer community 20, would receive a royalty payment.

Figure 4:
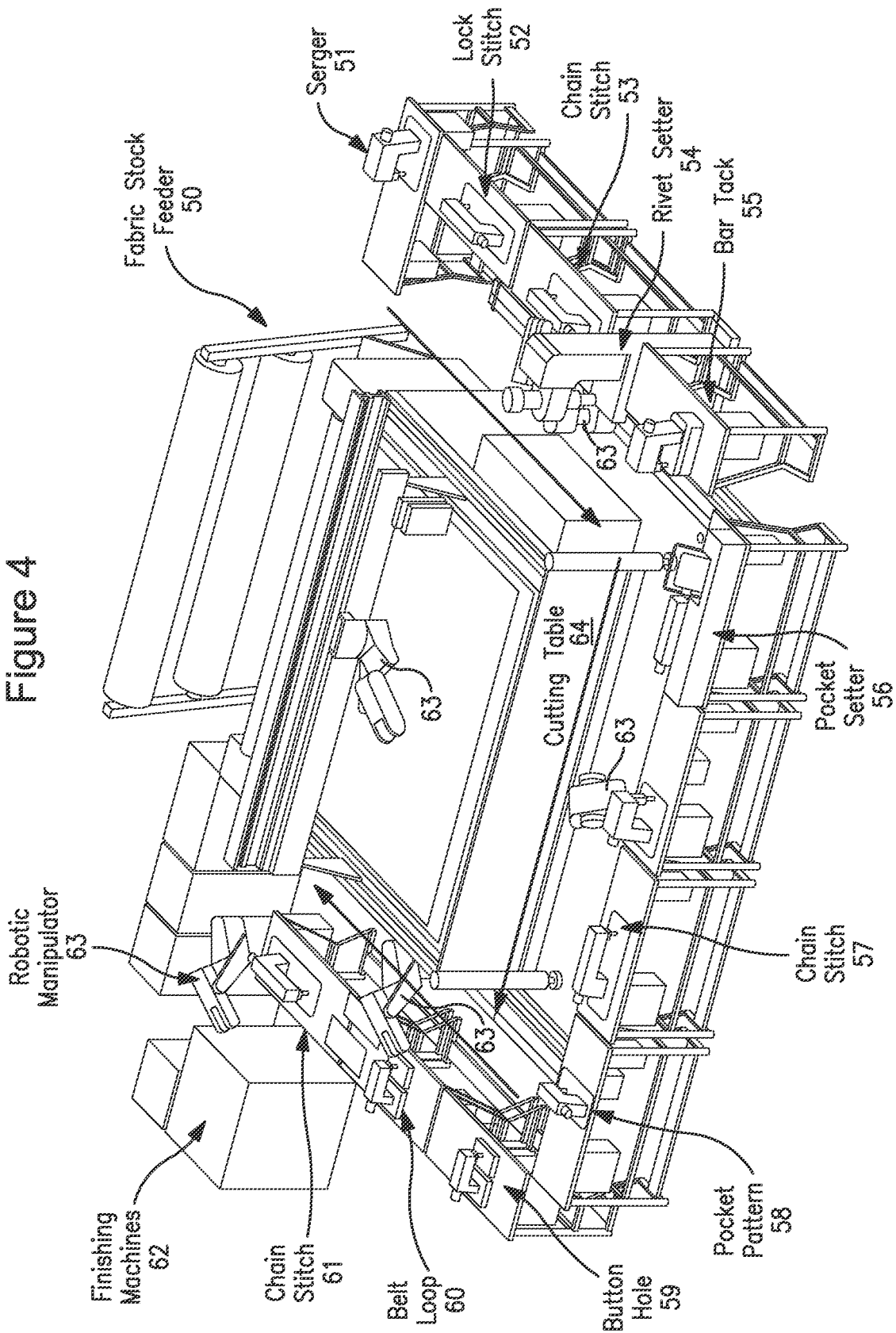
FIG. 4 illustrates a perspective view of an exemplary embodiment of a system for rapid automated preparation of a garment in accordance with the present invention.

FIG. 4 illustrates a perspective view of an embodiment of a system for rapid automated preparation of a garment in accordance with the present invention. The illustrated embodiment of a manufacturing system comprises a fabric stock feeder 50 which stores and delivers the desired fabric, serger 51, lock stitch sewing machine 52, chain stitch sewing machine 53, rivet setter 54, bar tacker 55, pocket setter 56, chain stitch sewing machine 57, pocket pattern machine 58, button holer 59, belt loop machine 60, chain stitch sewing machine 61, finishing machines 62, robotic manipulator 63, and cutting table 64. The cutting table can be equipped with multi-tool operating heads for use to mark the fabric with fiducial marks. These fiducial marks can be drawn with ink which is sensitive to wavelengths in the non-visible portions of the spectrum to minimize clutter in the visual field from the surrounding environment. Machine vision equipment can be used to detect the fiducial lines and to utilize these lines while manufacturing the garment.

Each of the machines illustrated in FIG. 4 is networked to a centralized control system (not illustrated) which operates and controls each machine. The robotic manipulators 63, also under control of the centralized control system, move the garment or workpieces through the manufacturing equipment in a sequential manner so that the garment can be sewn and finished in accordance with the customer's preferences.

Consistent with the invention, the robotic manipulator, also termed a robot, can have any kind of structure or configuration. The robotic manipulator can have a stylized anthropomorphic shape, such as Baxter robots manufactured by Rethink Robotics (Boston, Mass.), or those robots manufactured by Redwood Robotics (San Francisco, Calif.) or Kawada Industries (Tokyo, Japan). Alternatively, the robotic manipulator can consist of robotic arms and hands, for example, those manufactured by Barrett Robotics (Cambridge, Mass.). The robotic manipulator can have wheels, treads, or other means for movement, and move from one work station to the next sequentially during manufacture, or the robotic manipulator can be fixed in a single location during manufacture, or there may be any combination of moveable and stationary robotic manipulators. There may be one single robotic manipulator or there may be a plurality of robotic manipulators.

The manufacturing system illustrated in FIG. 4 is arranged in the shape of a letter "U" to form three separate manufacturing line segments, each having its own workflow direction, starting with serger 51 and ending with finishing machines 62. In alternative embodiments of the invention, the manufacturing equipment can be linear, in the shape of a letter "I", so that there is only a single workflow direction for the production. The arrangement of the manufacturing equipment will vary depending on the particular embodiment of the invention.

Figure 5:
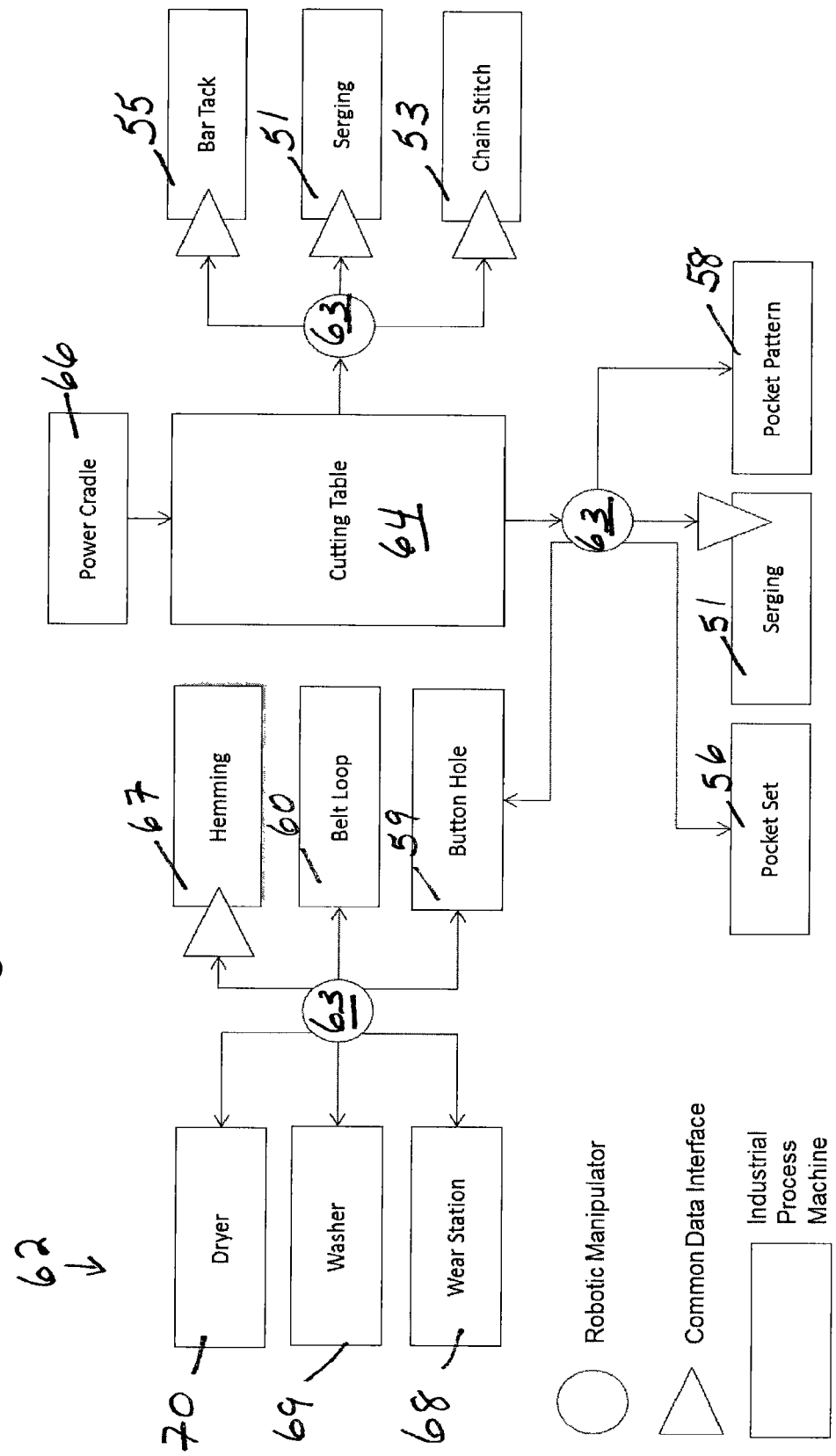
FIG. 5 illustrates a schematic diagram showing the physical arrangement of manufacturing equipment, material handling equipment, and a digital control system for manufacture of a garment in accordance with an exemplary embodiment of the present invention.
Figure 6:
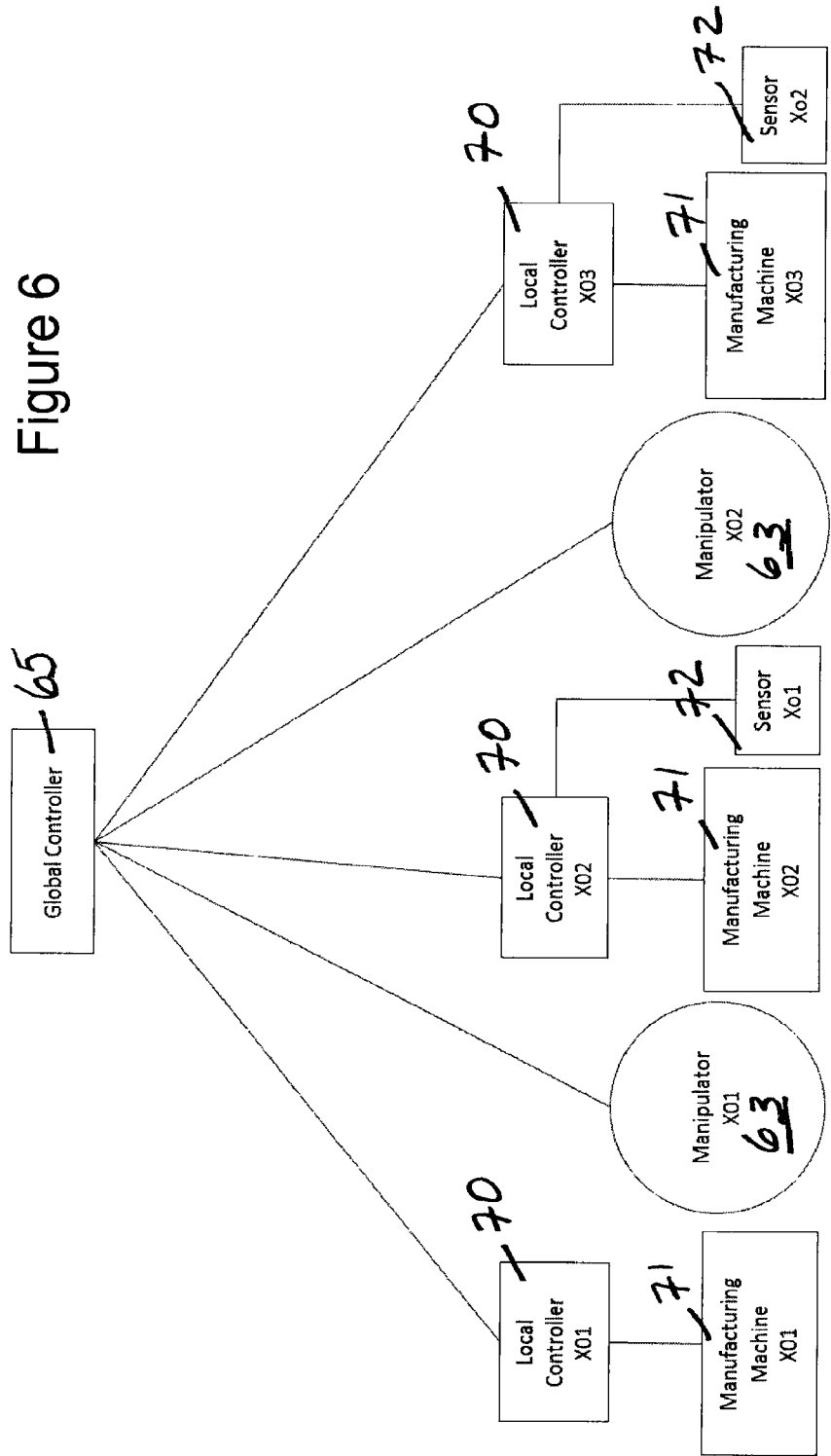
FIG. 6 is a schematic diagram depicting exemplary logic and information flows between a centralized control system and individual manufacturing and material handling equipment in accordance with an embodiment of the invention.

FIG. 5 illustrates an exemplary embodiment of a flow process for preparation of a pair of jeans in accordance with the invention. For ease of discussion, the manufacturing process can be divided into three line segments, each line segment attended to by a respective robot 63. The first line segment 101 comprises the serger 51, lock stitch sewing machine 52, chain stitch sewing machine 53, riveter 54, and bar tacker 55 attended to by the first robot 63. The second line segment 102 consists of the pocket setter 56, second serger 51, second lockstitch sewing machine 52, and pocket pattern machine 58, each attended to by the second robot 63. The third line segment 103 consists of button holer 59, belt loop machine 60, second chain stitch sewing machine 61, as well as the finishing machines consisting of a wear station 68, stretcher 80, stone washer 69A, washer 69, and dryer 70 and is attended to by third robot 63. Storage facilities 81 can be provided anywhere there is space available FIG. 6 depicts logic and information flows between a centralized control system and individual manufacturing and material handling equipment. The global or master controller 65 is in communications with a plurality of local controllers 70 over a network connection. Each of the local controllers 70 controls a respective manufacturing machine 71 which prepares the garment, or obtains information from an accompanying sensor 72 which provides data about the manufacturing process or a particular step thereof. The global or master controller is also in networked communications with the robotic manipulators 63, which move the garment or its components through the manufacturing equipment. The information from the centralized control system can be provided over a network connection to a remote human monitor who is not physically present at the manufacturing location.

Figures 7, 8:
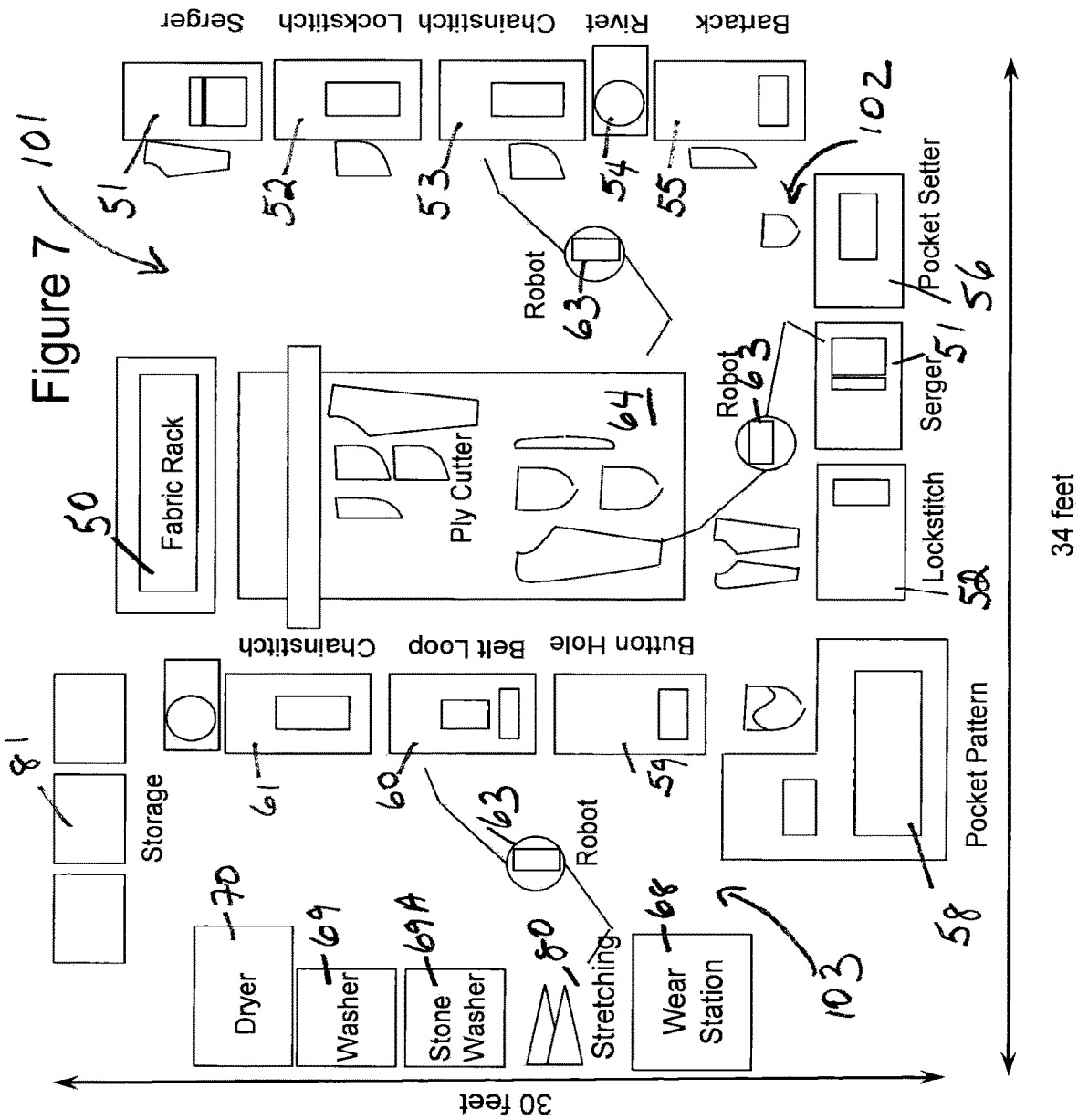
FIG. 7 illustrates an exemplary embodiment of a flow process for preparation of a garment in accordance with the present invention.
FIG. 8 illustrates manufacturing times for preparation of a pair of jeans in an exemplary embodiment of the present invention.

FIG. 7 illustrates an exemplary embodiment of a flow process for preparation of a pair of jeans in accordance with the invention. For ease of discussion, the manufacturing process can be divided into three line segments, each line segment attended to by a respective robot 63. The first line segment 101 comprises the serger 51, lock stitch sewing machine 52, chain stitch sewing machine 53, riveter 54, and bar tacker 55. The second line segment 102 consists of the pocket setter 56, second serger 51, second lockstitch sewing machine 52, and pocket pattern machine 58, each attended to by robot 63. The third line segment 103 consists of button holer 59, belt loop machine 60, second chain stitch sewing machine 61, as well as the finishing machines consisting of a wear station 68, stretcher 80, stone washer 69A, washer 69, and dryer 70. Storage facilities 81 can be provided anywhere there is space available.

The exemplary dimensions of the controlled manufacturing system shown in the Figure is 34 feet by 30 feet, although the specific dimensions of the system will vary depending on the specific embodiment of the invention.

FIG. 8 illustrates sample transit times during preparation of a pair of jeans in an exemplary embodiment of the invention. Line segment 1 totals approximately 430 seconds; line segment 2 totals approximately 540 seconds; and line segment 3 totals approximately 120 seconds, thereby totaling 1090 seconds, or about 18.2 minutes. These transit times indicate the approximate time it takes to move a garment or component thereof from one manufacturing machine to the next and do not include finishing such as washing, drying, ironing, or distressing.

Figure 9:
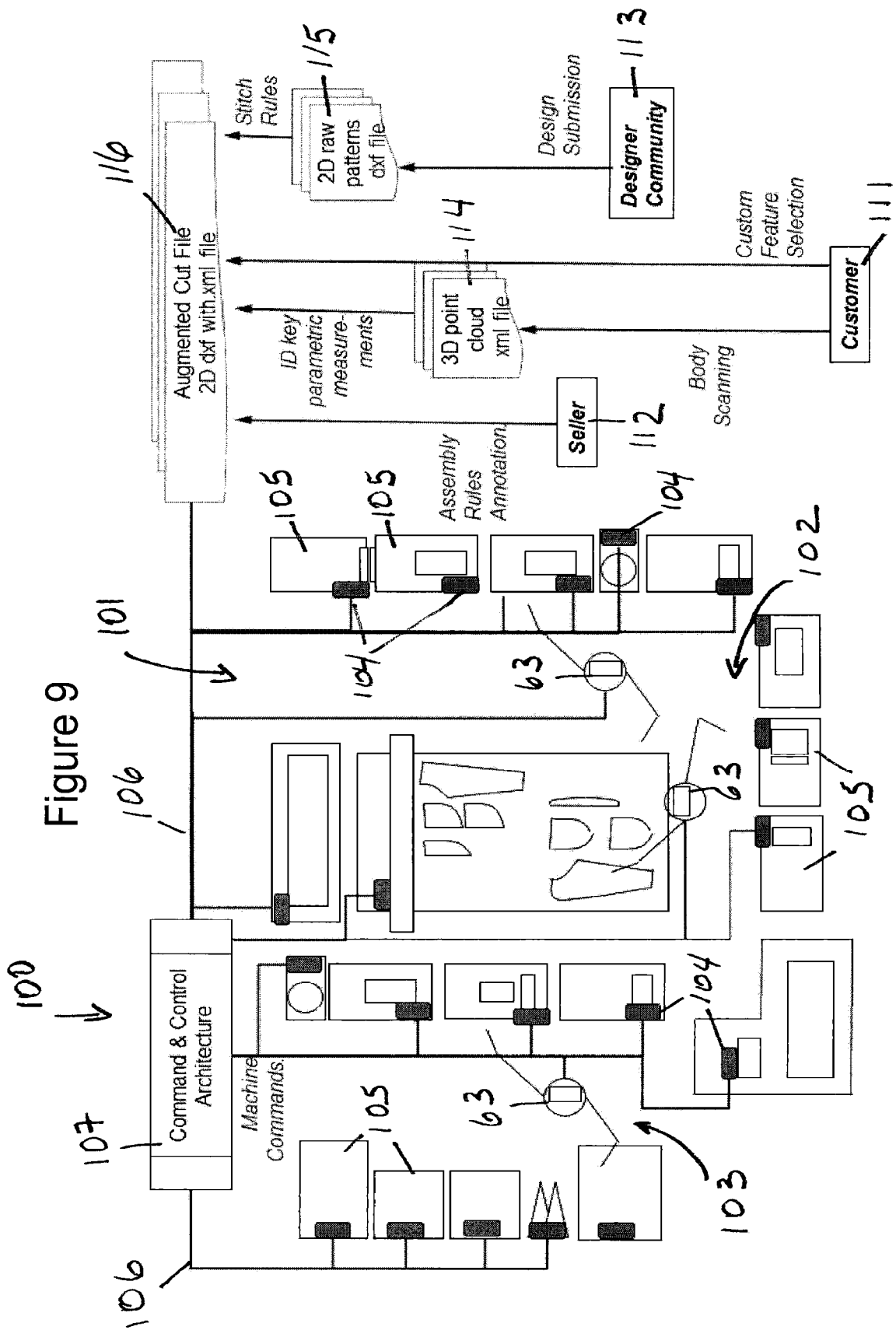
FIG. 9 illustrates a command and control architecture for directing garment preparation equipment in accordance with an exemplary embodiment of the invention.

FIG. 9 illustrates an exemplary architecture of a centralized command and control network system 100 for directing programmable garment manufacturing equipment in accordance with the present invention. The command and control system comprises a central controller 107 which is networked over a network connection 106 to a plurality of local controllers 104, and each local controller controls its respective programmable manufacturing machine 105. The central controller issues machine commands or machine instructions for each of the manufacturing equipment over the network to the local controllers so that the manufacturing equipment can prepare the personalized custom-fit garment as desired by the customer. The robotic manipulators 63 are also controlled by the central controller over the network connection, and each robotic manipulator is assigned a particular line segment 101, 102, or 103.

The centralized command and control system utilizes CNC instruction sets to direct the programmable manufacturing equipment. The CNC instruction sets 116 are generated from data from a number of different sources: data input by the seller 112; a three-dimensional point cloud 114 obtained by the three-dimensional body scan of a customer 111 as well as the customer's fit, style, and personalization preferences and custom feature selection; and stitch rules and raw two-dimensional pattern data 115 corresponding to a digital garment design submitted by a designer of the associated designer community 113.

Figure 10:
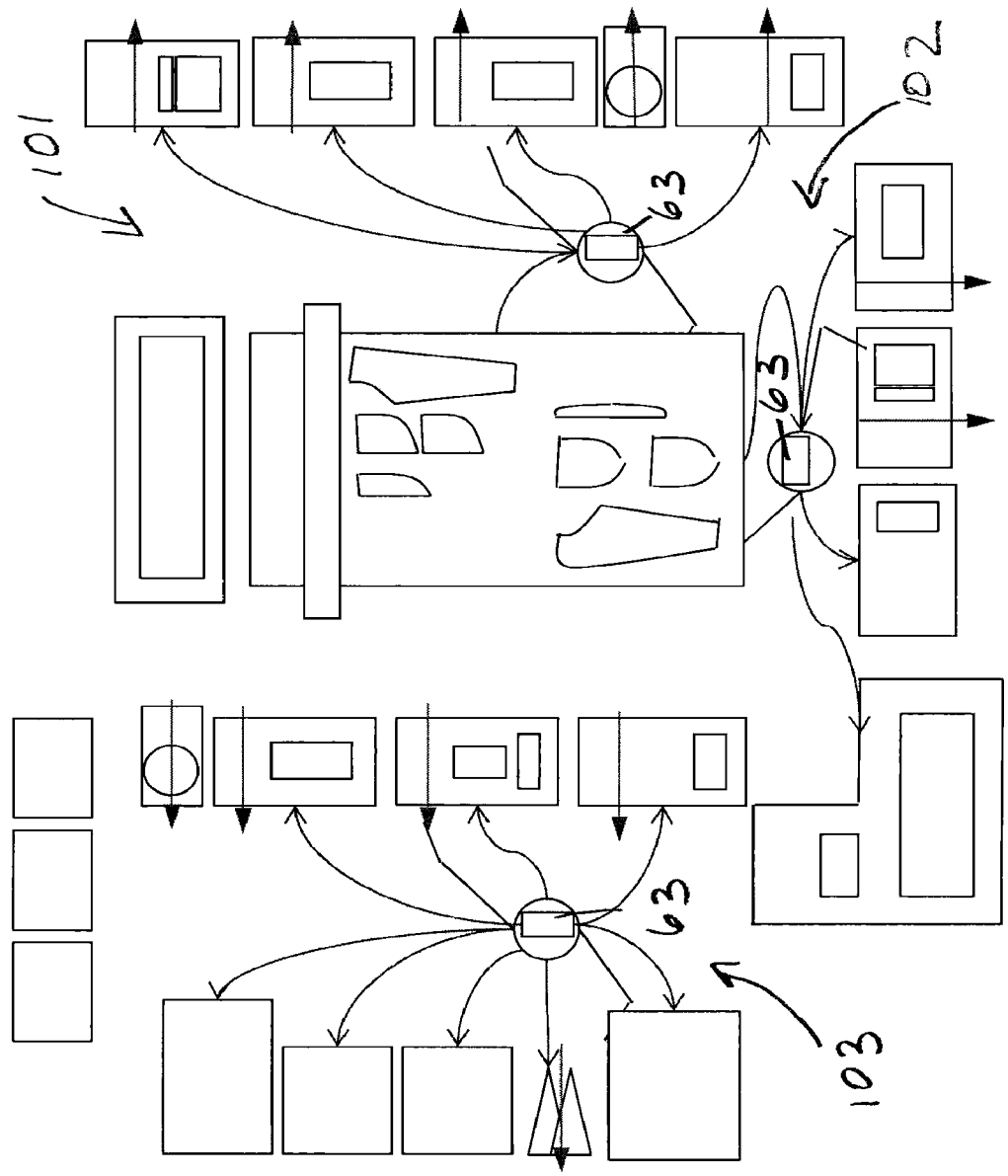
FIG. 10 illustrates robotic movement of pattern pieces through a workflow in accordance with an exemplary embodiment of the invention.

FIG. 10 illustrates robotic movement of pattern pieces through a workflow in accordance with an exemplary embodiment of the invention. Each robotic manipulator 63 attends to its assigned manufacturing line segment 101, 102, or 103.

The invention can be configured so that the manufacturing equipment manufactures a single garment at a time. Alternatively, the invention can be configured so that the manufacturing equipment prepares more than one garment in parallel. That is, as soon as one robotic manipulator completes its manufacturing line segment and passes its garment to the next robotic manipulator, it starts immediately working on next garment in the queue. Alternatively, multiple sections of a garment can be in simultaneous production at multiple machines in the production flow, rather than having the garment transit through each machine sequentially. Such embodiments allow for a reduction in cycle time so that the robotic manipulators are not idle and increase manufacturing throughput.

Figure 12:
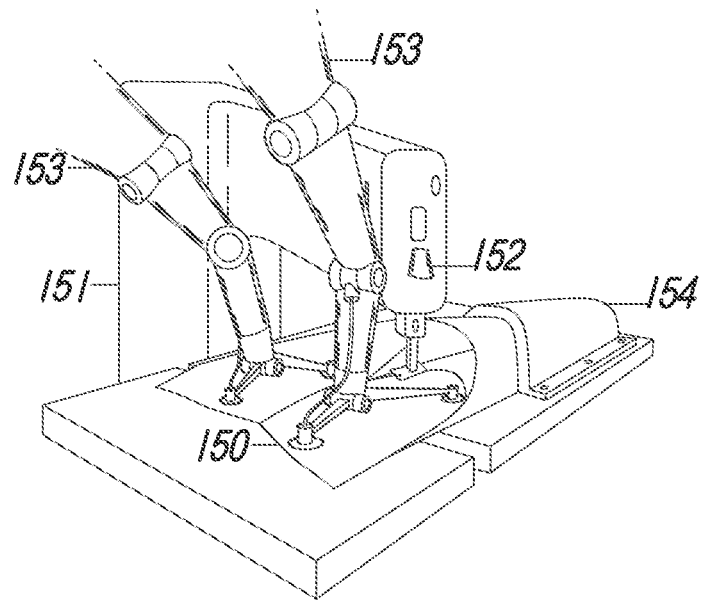
FIGS. 11 and 12 illustrate fabric stitching machines equipped with scanners for detecting fiducial lines, and stitching the fabric using the fiducial lines as guides.
Figure 11:
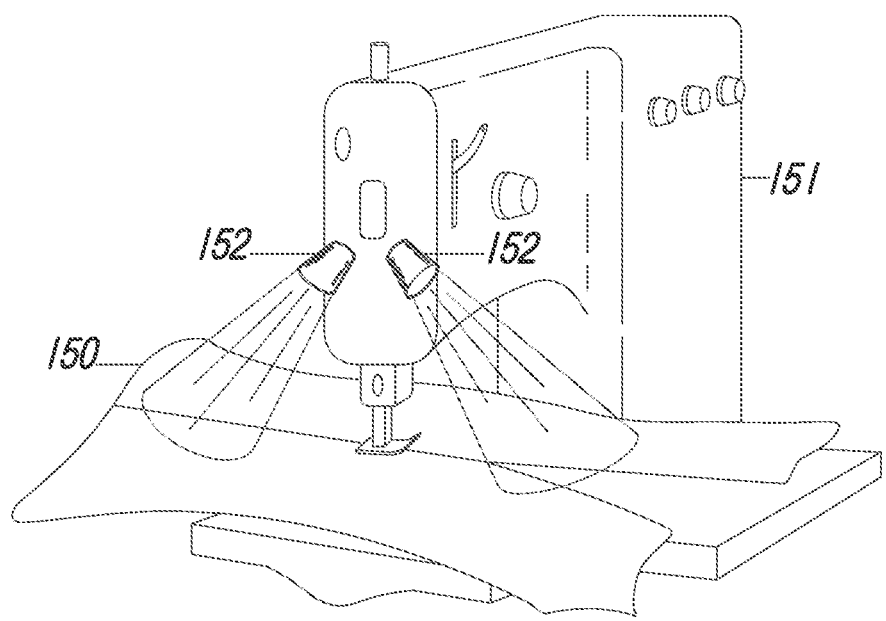

FIGS. 11 and 12 illustrate fabric stitching machines equipped with optical vision system or cameras for detecting fiducial marks, and handling and sewing the fabric using the fiduciary marks as guides. FIG. 11 shows a sewing machine 151 equipped with sensors 152 to identify fiduciary markings on the workpiece 150 to provide status, progress, and metrology feedback to the digital control system. The optical vision system can employ one or more passive electro-optical sensors in visible or non-visible wavelengths (such as UV or infrared) or both to identify fiducial lines or natural patterns for sewing. A closed-loop vision feedback system in coordination with the material handling and sewing machines allows for precise local position control.

FIG. 12 shows a robotic manipulator having arms 153 moving a workpiece 150 through a guidance fixture 154 to a sewing machine 151 equipped with optical vision sensors 152. The guidance fixture facilitates automated material handling and enables an imprecisely placed piece of fabric or garment to be accurately fed into a sewing or stitching machine. The specific configuration of the guidance fixture 154 will vary depending on the garment and manufacturing step.

Figure 13:
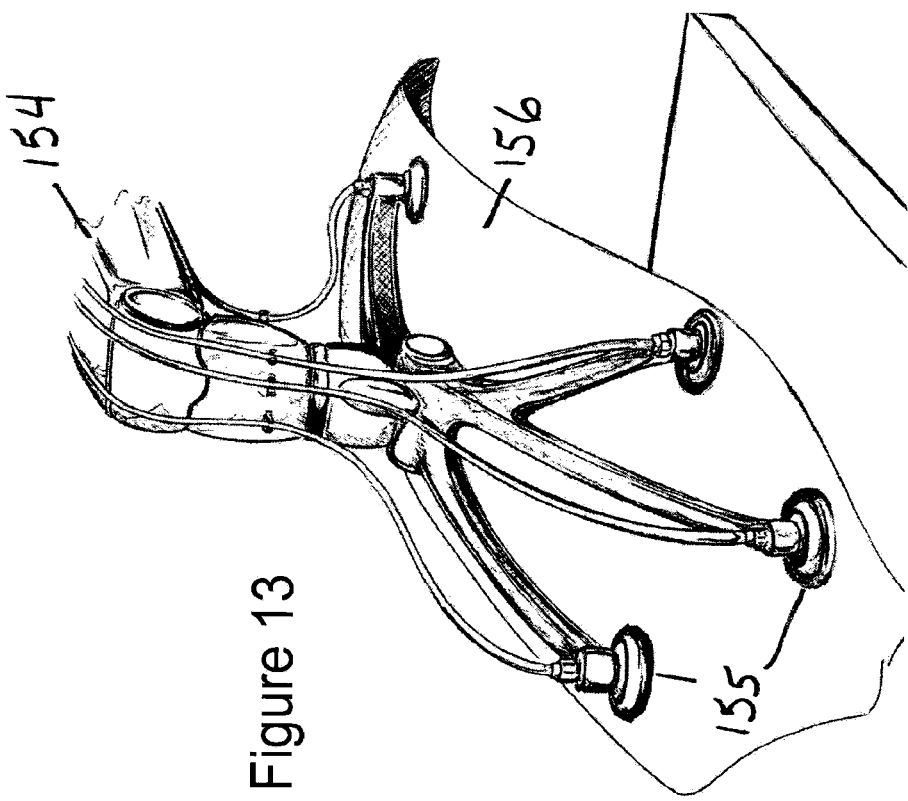
FIG. 13 illustrates an embodiment of a fabric gripper which uses vacuum to move fabric through the garment preparation equipment in accordance with the present invention.

FIG. 13 illustrates an exemplary embodiment of a fabric gripper using vacuum technology to move fabric through the garment manufacture equipment. The fabric gripper 154 can have a static shape comprising a plurality of arms 155, each having gripper elements at its extremity, which uses vacuum to pick up a garment or piece of fabric 156 and move the item without wrinkling to the next stage of manufacture. The gripper elements can be all the same size and configuration, or they may vary in structure. For smaller pattern pieces, unneeded gripper elements can be turned off or gripper arms can be moved out of the way. Fabric grippers for use in the present invention can have any kind of configuration or structure without limitation. The fabric grippers are not restricted to moving fabric and they can also be used to move garments from one location to another.

Figure 14:
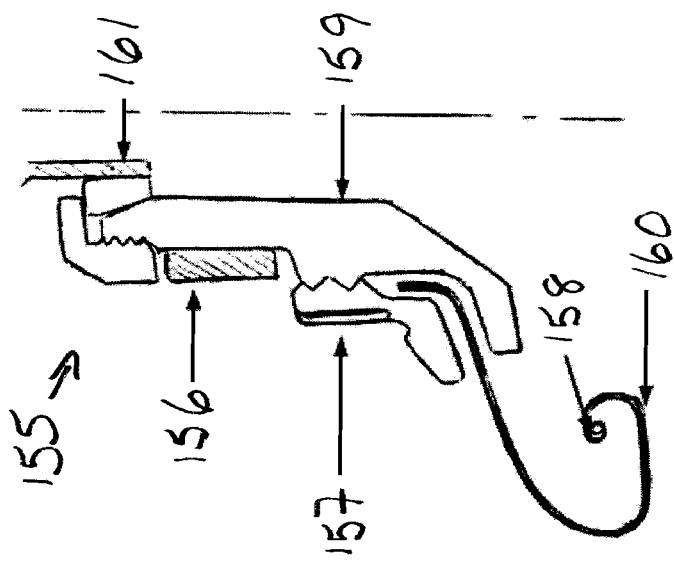
FIG. 14 illustrates a cross-section of the arm of the fabric gripper shown in FIG. 13.

FIG. 14 illustrates a cross-section of the arm 155 shown in FIG. 13. The arm 155 comprises an arm structure 156, vacuum body 159, vacuum fitting 157, wire stiffener 158, vacuum skirt 160, and vacuum hose 161. To move a piece of fabric from one location to another, the arm is placed on the fabric and the vacuum is activated. The fabric is then releasably held by the arm and can be moved to the desired location. To release the fabric, the vacuum is stopped and the arm moved away. The fabric grippers allow for movement and manipulation of fabric or garments without wrinkling.

Figures 15, 16, 17:
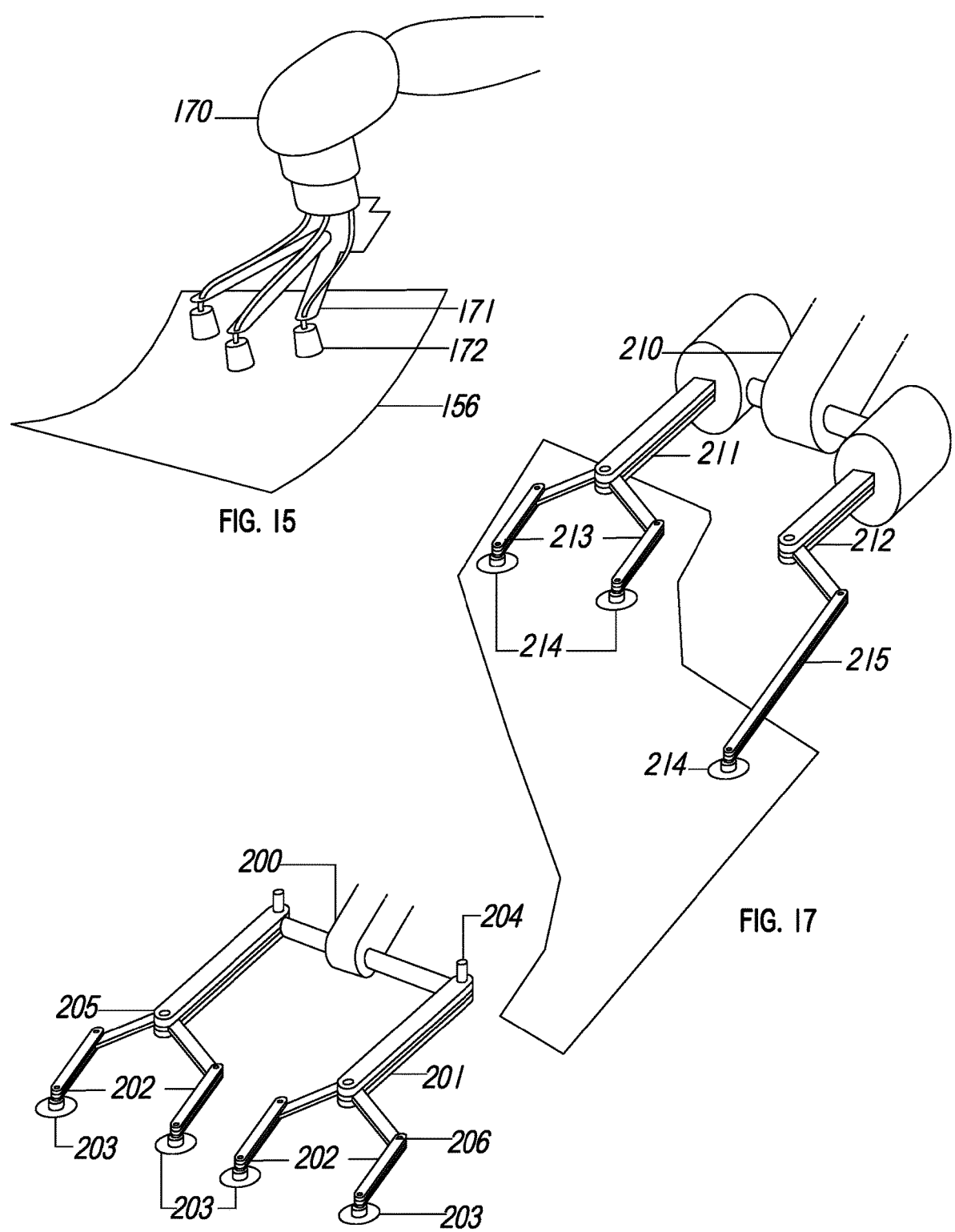
FIG. 15 illustrates another embodiment of a fabric gripper using vacuum to move fabric or a workpiece during preparation of a garment.
FIG. 16 illustrates another embodiment of a fabric gripper for moving a workpiece during preparation of a garment.
FIG. 17 illustrates a fabric gripper holding a pattern piece at key points without wrinkling.

FIG. 15 illustrates an embodiment of a fabric gripper which employs vacuum to hold fabric during preparation of a garment. The fabric gripper 170 has a plurality of arms 171 and each arm has a vacuum gripper element 172. Upon activation of the vacuum, the fabric 156 can be lifted and moved to a desired location, after which the vacuum will be disconnected and the fabric gripper removed. In another embodiment of the invention (not illustrated), the fabric gripper may be a pin gripper.

FIG. 16 is a close-up view of another exemplary embodiment of a fabric gripper having vacuum gripper elements for moving fabric or a garment. The notional reconfigurable fabric gripper 200 is belt driven, and has pancake motors at the base and interfaces to an arm of a robotic controller (not illustrated). The fabric gripper 200 has two arms 201, each arm having two lateral branches 202. At the terminus of each branch is a vacuum gripper element 203. The arms and branches are moveable about hinges 204/205/206 to provide for precise positioning of the vacuum gripper elements in the desired position for movement of a workpiece or garment to the next stage of manufacture.

FIG. 17 illustrates another embodiment of a fabric gripper having vacuum gripper elements. The fabric gripper 210 has two arms 211 and 212, each arm having a different structure. One arm 211 has two lateral branches 213, and each branch has a vacuum gripper element 214 at its terminus. The second arm 212 of the fabric gripper has a single branch 215 terminated by a vacuum gripper element 214. The arms and branches are moveable about hinges to provide for precise automated positioning of the vacuum gripper elements in the desired position for movement of a workpiece or garment to the next stage of manufacture. The positioning of the vacuum gripper elements 214 will depend on the key points that would exist for a particular pattern piece to allow it to be picked up without wrinkling.

Figure 18:
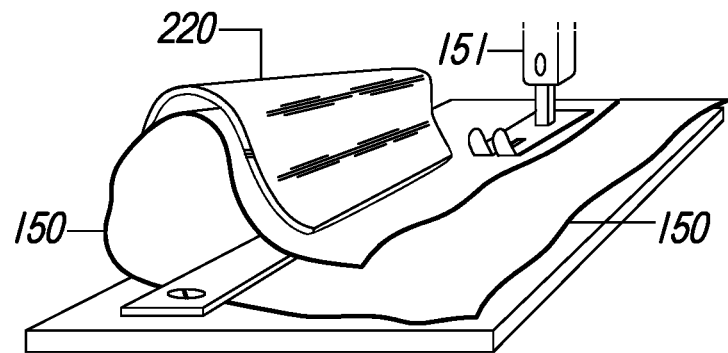
FIGS. 18 and 19 illustrate sewing machines using custom fixtures in the process of stitching garments and controlled by the command and control architecture.
Figure 19:
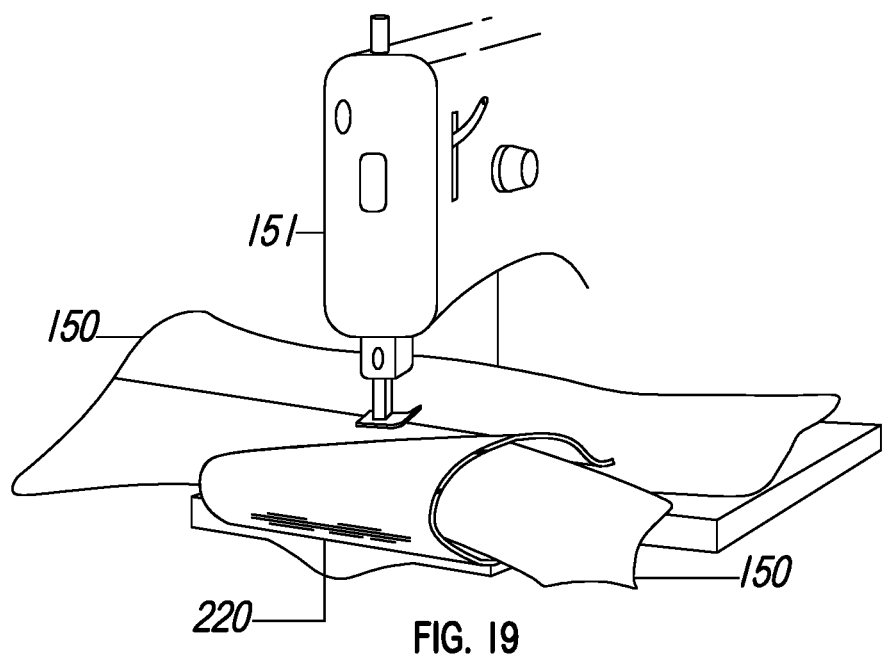

FIGS. 18 and 19 illustrate sewing machines 151 in the process of stitching garments 150 and being controlled by the centralized control system. The use of static guide jigs 220 aids the robotic manipulators in positioning fabric as it is fed through the sewing machines.

FIG. 20 illustrates a centralized control system 65 communicating with the robotic manipulators 63 and garment stitching equipment 151 over a network connection 106.

The computer code to perform the invention may be written in any programming language, such as but not limited to C/C++, Objective-C, Java, Basic/VisualBasic, or assembler. The computer code may comprise subroutines which are written in a proprietary computer language which is specific to the manufacturer of a circuit board, controller, or other computer hardware component used in conjunction with the invention.

FIG. 21 illustrates exemplary programmable manufacturing equipment and material handling equipment for use in preparation of a pair of jeans in accordance with an exemplary embodiment of the present invention. The programmable equipment includes stitching and sewing machines, fabric management hardware such as fabric spreaders and fixtures for precise stitching, and finishing equipment such as washers and dryers. Each of the manufacturing and material handling equipment is controlled by the centralized control system, thereby avoiding the need for human intervention and manual labor during the manufacture.

FIG. 22 illustrates an exemplary sequence of computer instructions for stitching a pair of jeans and the corresponding amount of time in seconds for each step. Each of the computer sequence steps in the Figure is converted to machine instructions by the centralized control system. The machine instructions are then implemented by the respective manufacturing and material handling equipment at the appropriate time when preparing the desired garment.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A method comprising:

creating a digital representation of an individual from a scan of the individual's body, and extracting from the digital representation sizing parameters;

receiving selection of a garment to be custom-manufactured for the individual, said garment represented by a digital pattern, and individual-specified features for tailoring the garment to the individual's personal tastes;

using the sizing parameters extracted from the digital representation, automatically adapting and customizing the garment by parametrically scaling the digital pattern representing the garment according to the sizing parameters extracted from the digital representation to adjust a shape and fit of the garment to a shape and size of the individual's body to obtain a digital pattern which is personalized to the individual;

displaying a dimensionally-accurate three-dimensional representation of a personalized custom-fit version of the garment, and iteratively updating the three-dimensional representation as the individual selects style and fit preferences for the garment;

producing a two-dimensional representation of a final version of the personalized custom-fit version of the garment, said two-dimensional representation comprising pattern pieces to be cut from fabric and sewn to manufacture the personalized custom-fit version of the garment; and converting the two-dimensional representation to a final set of instructions for machine manufacturability of the personalized custom-fit version of the garment.

2. The method of claim 1 wherein iteratively updating the three-dimensional representation as the individual selects style and fit preferences for the garment comprises:

receiving input on adjustable specifications through visualizing adjustments of the three-dimensional representation of a personalized custom-fit version of the garment; and converting specifications of the digital pattern representing the garment to a customized and personalized version of the digital pattern, wherein the specifications include some or all of:

design selections;
dimensions of at least one component of the selected design;
draping of at least one component of the selected design;
fit type of at least one component of the selected design;
fabric color of at least one component;
fabric characteristic of at least one component;
stitch style;
stitch spacing;
label placement;
thread or yarn quality;
thread or yarn weight;
thread or yarn type;
hardware placement;
embroidery selection;
embroidery placement; or
at least one wash type of each component.

3. The method of claim 1 wherein the personalized custom-fit version of the garment includes at least one fiducial mark to indicate the final set of instructions.

4. The method of claim 3 further comprising reading the fiducial mark by a sensor, wherein the final set of instructions further includes a handling guide, a sewing guide, manufacturing progress status feedback, or metrology feedback.

5. The method of claim 3 further comprising manufacturing the personalized custom-fit version of the garment based on the final set of instructions for machine manufacturability.

6. The method of claim 3 wherein the fiducial mark is formed by invisible ink, or ink that is visible in ultra-violet or infrared light spectra.

7. The method of claim 1 further comprising instructing a sewing machine to create the personalized custom-fit version of the garment.

8. The method of claim 1 further comprising instructing a design manufacturing machine to create the final version of the personalized custom-fit version of the garment, wherein the design manufacturing machine uses assembling components to create the final version of the personalized custom-fit version of the garment.

9. The method of claim 1 wherein selection of the garment is made from a database of designs from a designing community.

* * * * *